(12) United States Patent
Yang et al.

(10) Patent No.: US 12,522,853 B2
(45) Date of Patent: Jan. 13, 2026

(54) ENZYME MEDIATOR FUNCTIONALIZED POLYMERS FOR USE WITH ANALYTE SENSORS

(71) Applicant: Medtronic MiniMed, Inc., Northridge, CA (US)

(72) Inventors: Qingling Yang, Northridge, CA (US); Ashwin K. Rao, West Hills, CA (US); Hanieh Ghadimi, Sherman Oaks, CA (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 182 days.

(21) Appl. No.: 18/480,790

(22) Filed: Oct. 4, 2023

(65) Prior Publication Data

US 2024/0158827 A1    May 16, 2024

Related U.S. Application Data

(60) Provisional application No. 63/420,207, filed on Oct. 28, 2022.

(51) Int. Cl.
*C12Q 1/00* (2006.01)

(52) U.S. Cl.
CPC ............ *C12Q 1/006* (2013.01); *C12Q 1/004* (2013.01)

(58) Field of Classification Search
CPC ...... C12Q 1/006; C12N 9/0006; C12N 11/08; C12Y 101/01047
See application file for complete search history.

(56) References Cited

U.S. PATENT DOCUMENTS

| | | |
|---|---|---|
| 4,755,173 A | 7/1988 | Konopka et al. |
| 5,391,250 A | 2/1995 | Cheney, II et al. |
| 5,485,408 A | 1/1996 | Blomquist |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |
| 5,954,643 A | 9/1999 | Van Antwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |

(Continued)

FOREIGN PATENT DOCUMENTS

| | | |
|---|---|---|
| EP | 0992589 A2 * | 4/2000 ............ C12Q 1/006 |
| EP | 2665827 A1 | 11/2013 |
| WO | 2022125537 A2 | 6/2022 |

OTHER PUBLICATIONS

Dojindo "Amine-reactive PES" 3 pgs, available online Feb. 7, 2023 (Year: 2023).*

(Continued)

*Primary Examiner* — Thane Underdahl
(74) *Attorney, Agent, or Firm* — GATES & COOPER LLP

(57) ABSTRACT

Embodiments of the invention provide amperometric analyte sensors having elements selected to optimize enzymatic activities associated with such sensors including polymers functionalized with enzymatic mediators as well as methods for making and using such sensors. While embodiments of the invention can be used in a variety of contexts, typical embodiments of the invention include glucose or ketone sensors used in the management of diabetes.

19 Claims, 10 Drawing Sheets

(56) References Cited

U.S. PATENT DOCUMENTS

| | | |
|---|---|---|
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 2007/0123819 A1 | 5/2007 | Mernoe et al. |
| 2010/0160861 A1 | 6/2010 | Causey, III et al. |
| 2017/0315077 A1* | 11/2017 | Rao .................. A61B 5/14865 |
| 2022/0133190 A1 | 5/2022 | Ong |
| 2022/0338768 A1 | 10/2022 | Tsang et al. |

OTHER PUBLICATIONS

Hiraka et al. "Rational engineering of Aerococcus viridans L-lactate oxidase for the mediator modification to achieve quasi-direct electron transfer type lactate sensor" Biosensors and Bioelectronics 151 (2020) 111974, 9pgs (Year: 2020).*

Fitriana et al. "A Thiol-reactive Phenazine Ethosulfate—A Novel Redox Mediator for Quasi-direct Electron-transfer-type Sensors" Sensors and Materials, vol. 34, No. 6 (2022) 2105-2124 (Year: 2022).*

Extended European Search Report dated Mar. 20, 2024 for European Application No. 23205590.5.

Hatada et al: "Development of a glucose sensor employing quick and easy modification method with mediator for altering electron acceptor preference", Bioelectrochemistry, vol. 121, Jun. 1, 2018 (Jun. 1, 2018), pp. 185-190.

* cited by examiner

ENZYME MEDIATOR FUNCTIONALIZED POLYMERS FOR USE WITH ANALYTE SENSORS

CROSS-REFERENCE TO RELATED APPLICATIONS

This application claims the benefit under 35 U.S.C. Section 119(e) of co-pending and U.S. Provisional Patent Application Ser. No. 63/420,207, filed on Oct. 28, 2023 and entitled "ENZYME MEDIATOR FUNCTIONALIZED POLYMERS FOR USE WITH ANALYTE SENSORS" which application is incorporated by reference herein.

BACKGROUND OF THE INVENTION

1. Field of the Invention

Analyte sensors (e.g. glucose sensors used in the management of diabetes) and methods and materials for making and using such sensors.

2. Description of Related Art

Analyte sensors such as biosensors include devices that use biological elements to convert a chemical analyte in a matrix into a detectable signal. There are many types of biosensors used for a wide variety of analytes. The most studied type of biosensor is the amperometric glucose sensor, which is crucial to the successful glucose level control for diabetes.

One common problem with electrochemical sensors is that they can electrochemically react not only with the analyte to be measured (or by-product of the enzymatic reaction with the analyte), but can also react with other electroactive chemical species that are not intentionally being measured, which causes an increase in signal strength due to these "interfering species". Typically, such interfering species are compounds with an oxidation or reduction potential that overlaps with the analyte to be measured (or by-product of the enzymatic reaction with the analyte). For example, in a conventional amperometric glucose oxidase-based glucose sensor wherein the sensor measures hydrogen peroxide, interfering species such as acetaminophen, ascorbate, m-cresol, phenol, glycerol and urate are known to confound true analyte signals.

For the above-noted reasons, methods and materials designed to improve sensor function and address the difficulties caused by such interfering species are desirable.

SUMMARY OF THE INVENTION

As disclosed herein, problems with spurious electronic signals that can occur in electrochemical analyte sensors as a result of interfering species present in in vivo environments can be overcome by using electrochemical analyte sensors having a constellation of materials that allow them to sense true analyte signals while avoiding confounding signals that can be caused by interfering species. As discussed below, we show that agents such as enzyme mediators can be incorporated into analyte sensor materials in order to allow these sensors to function using electrical operating potentials within ranges that do not elicit confounding signals in the presence of interferents. In one illustrative embodiment of the invention, the mediator Amine Reactive Phenazine Ethosulphate (Ar-PES), IUPAC name 1-[3-(Succinimidyloxycarbonyl)propoxy]-5-ethylphenazinium triflate is used in such sensor designs. In this embodiment, AR-PES can be coupled to amine functional polymers such as polylysine, polymers which can be operatively coupled (e.g., crosslinked) with various agents such as mediators as well as coenzymes including flavin adenine dinucleotide "FAD" (e.g., for use with glucose dehydrogenase enzymes) and nicotinamide adenine dinucleotide "NAD" (e.g., for use with 3-hydroxybutyrate dehydrogenases). Constellations of such polymer mediator and coenzyme elements can be used produce electrochemical enzyme systems which facilitate the transfer electrons from enzyme/analyte reactions to sensor electrodes, thereby avoiding problems with confounding sensor signals that occur in the presence of interferents.

Certain conventional amperometric glucose sensors function by using relatively high electrical applied potentials, for example an applied potential around 535 mV. By using agents/mediators such as those disclosed herein, the operating potential of the electrochemical analyte sensors can be dropped to below 300 mV. For example, in typical embodiments of the invention, the operating potential can a range from −200 mV to +100 mV (e.g., 0 mV), an operating potential range appropriate for observing electrical signals from an analyte of interest yet one where signals from interfering species do not confound true analyte signals. The sensor designs comprising mediators and the like that are disclosed herein function as conventional sensors and, for example, show linear responses to physiological concentrations of glucose. While glucose oxidase-based glucose sensors are used to demonstrate working embodiments of the invention, the mediator/polymer elements can also be used in other enzyme systems such as those that utilize lactate oxidase or various dehydrogenases such as 3-hydroxybutyrate dehydrogenases. Surprisingly, the mediator/enzyme systems disclosed herein have been discovered to function well following sterilization processes that uses ethylene oxide, a sterilizing agent that can compromise the operability of certain sensor designs.

The present invention provides methods and materials designed to improve sensor sensitivity and address the difficulties caused by interfering species present in in vivo environments. Embodiments of the invention include, for example, methods of making an analyte sensor apparatus. Such methods typically comprise the steps of providing a base layer; forming a conductive layer on the base layer, wherein the conductive layer includes a working electrode. These methods further include forming an analyte sensing layer over the working electrode, wherein the analyte sensing layer comprises an enzyme selected to react with an analyte; and this enzyme is operatively coupled to a polymer functionalized with an agent selected to mediate reactivity of the enzyme with the analyte. In embodiments of the invention, one or more intervening layers (e.g., one comprising an interference rejection membrane) can be formed over the working electrode, for example between the analyte sensing layer and the working electrode. The methods further include forming an analyte modulating layer over the analyte sensing layer, wherein the analyte modulating layer includes a composition that modulates the diffusion of the analyte therethrough. In embodiments of the invention, one or more intervening layers can be formed over the analyte modulating layer, for example between the analyte sensing layer and the analyte modulating layer.

A variety of materials can be used in various embodiments of the invention. In certain embodiments of the invention, the enzyme comprises a glucose dehydrogenase, a 3-hydroxybutyrate dehydrogenase, a lactate oxidase or a glucose oxidase. In certain embodiments, the agent comprises a mediator such as an amine Reactive Phenazine Ethosulphate "AR-PES", (IUPAC name 1-[3-(Succinimidyloxycarbonyl)propoxy]-5-ethylphenazinium triflate). In embodiments of the invention, the polymer can comprise a polylysine polymer; a polyallylamine polymer; a polyethylene glycol polymer; a polyethyleneimine polymer, or the like. In certain embodiments of the invention, the analyte sensing layer is operably coupled to a flavin adenine dinucleotide or a nicotinamide adenine dinucleotide. Optionally, a mediator is coupled to amine functionalized polymers, wherein said polymers are further crosslinked with the enzyme in a manner that facilitates electron transfer from an enzyme-analyte reaction to the working electrode. In certain embodiments of the invention, the working electrode is formed from a carbon composition. In addition, these methods can further comprise sterilizing the analyte sensor apparatus using a sterilization process that includes exposing the analyte sensor apparatus to an ethylene oxide gas.

Embodiments of the invention include analyte sensor apparatuses comprising the constellations of elements disclosed herein. Typically, such analyte sensor apparatuses comprise a base layer; a conductive layer disposed on the base layer, wherein the conductive layer includes a working electrode; an analyte sensing layer disposed on the working electrode, wherein the analyte sensing layer comprises an enzyme selected to react with the analyte; and is operatively coupled to a polymer functionalized with an agent selected to mediate reactivity of the enzyme (e.g. "AR-PES" 1-[3-(Succinimidyloxycarbonyl)propoxy]-5-ethylphenazinium triflate); and an analyte modulating layer disposed on the analyte sensing layer, wherein the analyte modulating layer includes a composition that modulates the diffusion of the analyte therethrough. In such analyte sensor apparatuses, the enzyme can comprise a glucose dehydrogenase, a 3-hydroxybutyrate dehydrogenase, a lactate oxidase, a glucose oxidase or the like. In such analyte sensor apparatuses, the polymer can comprise a polylysine polymer; a polyallylamine polymer; a polyethylene glycol polymer; a polyethyleneimine polymer or the like. In certain embodiments of such sensors, the analyte sensing layer is operably coupled to a flavin adenine dinucleotide or a nicotinamide adenine dinucleotide. In certain embodiments of such sensors, AR-PES is coupled to a polylysine that is crosslinked further with the enzyme in a manner that facilitates electron transfer from an analyte enzyme reaction to the working electrode (e.g. one formed from a carbon composition).

Embodiments of the invention disclosed herein include selected constellations of elements. For example, in certain embodiments of the invention, a polylysine polymer is coupled to a mediator (e.g. AR-PES), and this polymer is further coupled to both an enzyme such as glucose oxidase or glucose dehydrogenase (e.g., via glutaraldehyde crosslinking) and a cofactor such as NAD. In other embodiments of the invention, a polyethyleneimine (PEI) polymer is coupled to a mediator (e.g. AR-PES), and this polymer is further coupled to both an enzyme such as 3-hydroxybutyrate dehydrogenase and a cofactor such as NAD (e.g., using poly (ethylene) glycol diglycidyl ether (PEGDGE) as a crosslinker).

Embodiments of the invention also include methods of estimating the concentrations of an analyte (e.g. glucose, lactate, 3-hydroxybutyrate or the like) in vivo. Typically, such methods include disposing an amperometric analyte sensor disclosed herein into an in vivo environment of a subject, wherein the environment comprises the analyte; and then estimating the concentration of the analyte; so that the concentrations of the analyte in vivo are estimated. In typical embodiments of these methods, the analyte sensor apparatus senses the analyte using an operating potential that is from −200 millivolts to +100 millivolts (e.g. 0 millivolts).

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE FIGURES

As shown in FIG. 4, a potentiostat 300 may include an op amp 310 that is connected in an electrical circuit so as to have two inputs: Vset and Vmeasured. As shown, Vmeasured is the measured value of the voltage between a reference electrode and a working electrode. Vset, on the other hand, is the optimally desired voltage across the working and reference electrodes. The current between the counter and reference electrode is measured, creating a current measurement (isig) that is output from the potentiostat.

DETAILED DESCRIPTION OF THE INVENTION

Figure 1:
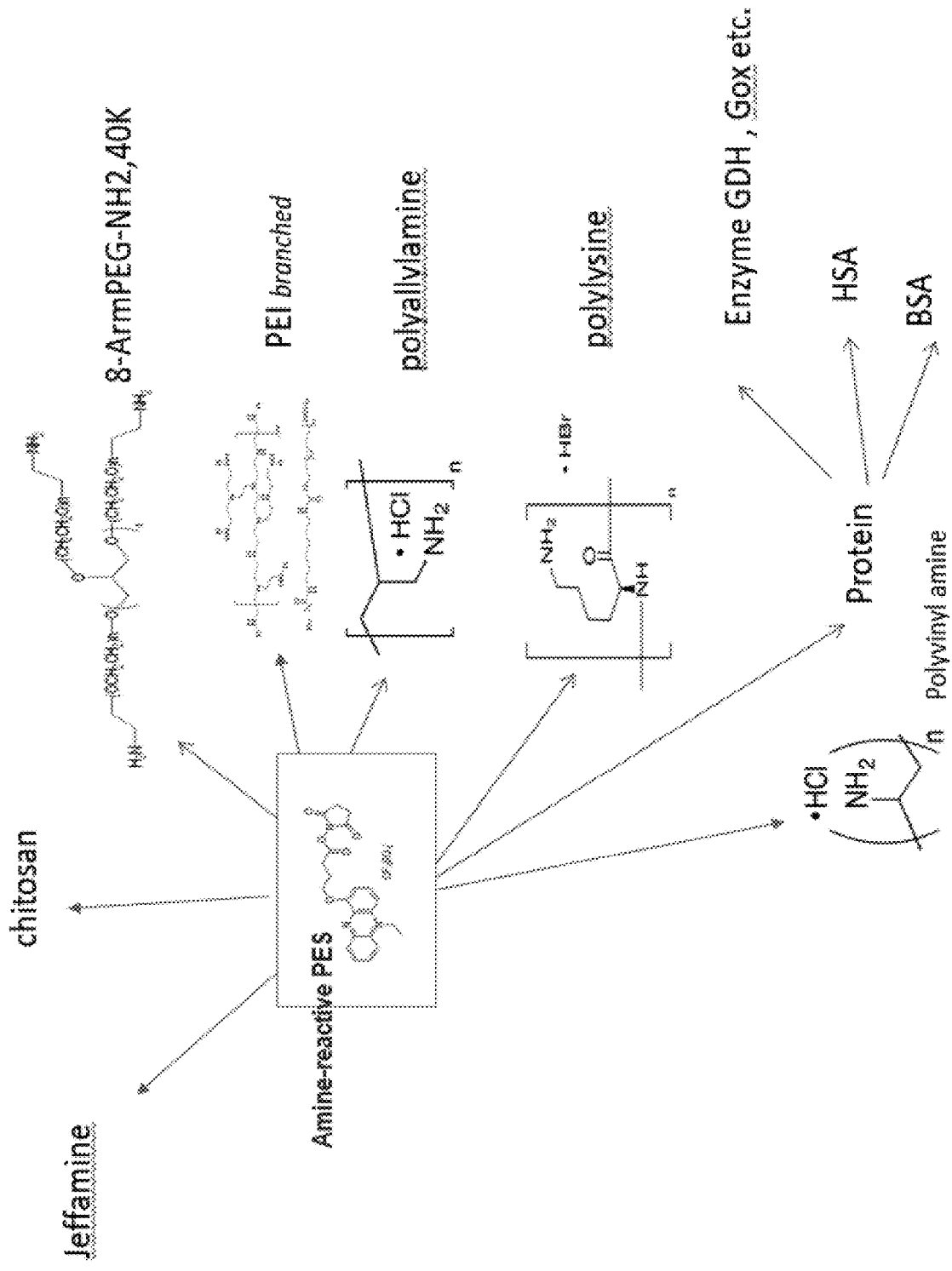
FIG. 1 provides a schematic showing illustrative elements for use with embodiments of the invention, for example, amine-reactive PES as a mediator; polyethylenimine (PEI), PEG, polyallylamine polyvinyl amine or polylysine as polymers and glucose dehydrogenase or glucose oxidase as the enzyme.

Unless otherwise defined, all terms of art, notations, and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. In addition, certain text from related art is reproduced herein to more clearly delineate the various embodiments of the invention. A number of terms are defined below.

All publications mentioned herein are expressly incorporated herein by reference to disclose and describe the methods and/or materials in connection with which the publications are cited. Publications cited herein are cited for their disclosure prior to the filing date of the present application. Nothing here is to be construed as an admission that the inventors are not entitled to antedate the publications by virtue of an earlier priority date or prior date of invention. Further the actual publication dates may be different from those shown and require independent verification.

It must be noted that as used herein and in the appended claims, the singular forms "a", "and", and "the" include plural referents unless the context clearly dictates otherwise. Thus, for example, reference to "an oxidoreductase" includes a plurality of such oxidoreductases and equivalents thereof known to those skilled in the art, and so forth. All numbers recited in the specification and associated claims that refer to values that can be numerically characterized with a value other than a whole number (e.g. the concentration of a compound in a solution) are understood to be modified by the term "about".

The term "analyte" as used herein is a broad term and is used in its ordinary sense, including, without limitation, to refer to a substance or chemical constituent in a fluid such as a biological fluid (for example, blood, interstitial fluid, cerebral spinal fluid, lymph fluid or urine) that can be analyzed. Analytes can include naturally occurring substances, artificial substances, metabolites, and/or reaction products. In some embodiments, the analyte for measurement by the sensing regions, devices, and methods is glucose. However, other analytes are contemplated as well, including but not limited to, lactate. Salts, sugars, proteins fats, vitamins and hormones naturally occurring in blood or interstitial fluids can constitute analytes in certain embodiments. The analyte can be naturally present in the biological fluid or endogenous; for example, a metabolic product, a hormone, an antigen, an antibody, and the like. Alternatively, the analyte can be introduced into the body or exogenous, for example, a contrast agent for imaging, a radioisotope, a chemical agent, a fluorocarbon-based synthetic blood, or a drug or pharmaceutical composition, including but not limited to insulin. The metabolic products of drugs and pharmaceutical compositions are also contemplated analytes.

The terms "interferents" and "interfering species/compounds" are used in their ordinary sense, including, but not limited to, effects and/or chemical species/compounds that interfere with the measurement of an analyte of interest in a sensor to produce a signal that does not accurately represent the analyte measurement. In one example of an electrochemical sensor, interfering species are compounds with an oxidation potential that overlaps with the analyte to be measured so as to produce spurious signals.

The term "sensor," as used herein, is a broad term and is used in its ordinary sense, including, without limitation, the portion or portions of an analyte-monitoring device that detects an analyte. In one embodiment, the sensor includes an electrochemical cell that has a working electrode, a reference electrode, and optionally a counter electrode passing through and secured within the sensor body forming an electrochemically reactive surface at one location on the body, an electronic connection at another location on the body, and a membrane system affixed to the body and covering the electrochemically reactive surface. During general operation of the sensor, a biological sample (for example, blood or interstitial fluid), or a portion thereof, contacts (directly or after passage through one or more membranes or domains) an enzyme (for example, glucose oxidase); the reaction of the biological sample (or portion thereof) results in the formation of reaction products that allow a determination of the analyte level in the biological sample.

As discussed in detail below, embodiments of the invention relate to the use of an electrochemical sensor that exhibits a novel constellation of elements having a unique set of technically desirable material properties, for example a polymer (e.g. a polylysine polymer) functionalized with an agent (e.g. Ar-PES) selected to mediate reactivity of an enzyme with the analyte. The electrochemical sensors of the invention are designed to measure a concentration of an analyte of interest (e.g. glucose) or a substance indicative of the concentration or presence of the analyte in fluid. In some embodiments, the sensor is a continuous device, for example a subcutaneous, transdermal, or intravascular device. In some embodiments, the device can analyze a plurality of intermittent blood samples. The sensor embodiments disclosed herein can use any known method, including invasive, minimally invasive, and non-invasive sensing techniques, to provide an output signal indicative of the concentration of the analyte of interest. Typically, the sensor is of the type that senses a product or reactant of an enzymatic reaction between an analyte and an enzyme in the presence of oxygen as a measure of the analyte in vivo or in vitro. Such sensors typically comprise a membrane surrounding the enzyme through which an analyte migrates. The product is then measured using electrochemical methods and thus the output of an electrode system functions as a measure of the analyte.

As discussed in detail below, embodiments of the invention disclosed herein provide sensor elements having enhanced material properties and/or architectural configurations and sensor systems (e.g. those comprising a sensor and associated electronic components such as a monitor, a processor and the like) constructed to include such elements. The disclosure further provides methods for making and using such sensors and/or architectural configurations. While some embodiments of the invention pertain to glucose and/or lactate sensors, a variety of the elements disclosed herein (e.g. a polymer functionalized/coupled with an agent selected to mediate reactivity of an enzyme with the analyte) can be adapted for use with any one of the wide variety of sensors known in the art. The analyte sensor elements, architectures, and methods for making and using these elements that are disclosed herein can be used to establish a variety of layered sensor structures. Such sensors of the invention exhibit a surprising degree of flexibility and versatility, characteristics which allow a wide variety of sensor configurations to be designed to examine a wide variety of analyte species.

Specific aspects of embodiments of the invention are discussed in detail in the following sections.

I. Typical Elements, Configurations and Analyte Sensor Embodiments of the Invention A wide variety of sensors and sensor elements are known in the art including amperometric sensors used to detect and/or measure biological analytes such as glucose. Many glucose sensors are based on an oxygen (Clark-type) amperometric transducer (see, e.g. Yang et al., Electroanalysis 1997, 9, No. 16: 1252-1256; Clark et al., Ann. N.Y. Acad. Sci. 1962, 102, 29; Updike et al., Nature 1967, 214,986; and Wilkins et al., Med. Engin. Physics, 1996, 18, 273.3-51). A number of in vivo glucose sensors utilize hydrogen peroxide-based amperometric transducers because such transducers are relatively easy to fabricate and can readily be miniaturized using conventional technology. A problem associated with the use of hydrogen peroxide-based amperometric transducers, however, is signal interference due to electroactive substances present in the analyte environment. Current sensors in the art commonly lack selectivity against other electrochemically reactive substances such as acetaminophen and other drugs, which would lead to significant false signals if not eliminated.

A variety of electrochemical analyte sensors function by applying an electrical potential to one or more sensor electrodes that are designed to provide different electronic signals in the presence of an analyte of interest (e.g., electrochemical glucose sensors that are used by diabetic individuals). In such electrochemical analyte sensors, problems can arise when an electrical operating potential applied to the electrode generates signals that are not only associated with the presence of analyte, but also generate signals in response to the presence of non-analyte agents present in the environment in which the analyte is sensed. For example, in electrochemical glucose sensors that are designed to apply relatively high electrode potentials to the sensor electrode(s) (e.g., an applied potential of 535 mV) spurious non-analyte signals are observed for interferents such as certain drugs a patient may be taking (e.g., acetaminophen), and/or additives commonly combined with insulin formulation that are administered to diabetic patients (e.g., m-cresol, phenol and glycerol).

Figure 4:
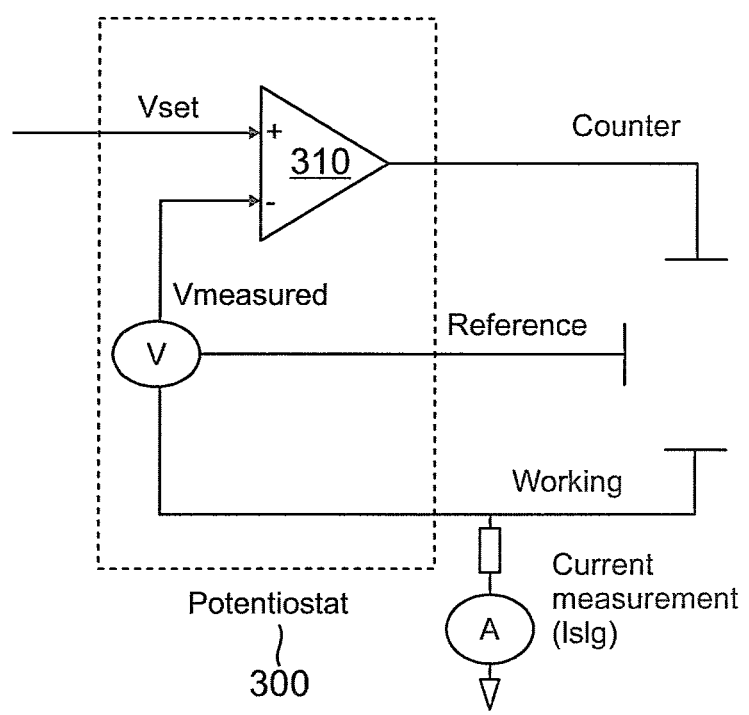
FIG. 4 shows a schematic of a potentiostat that may be used to measure current in embodiments of the present invention.
Figure 5:
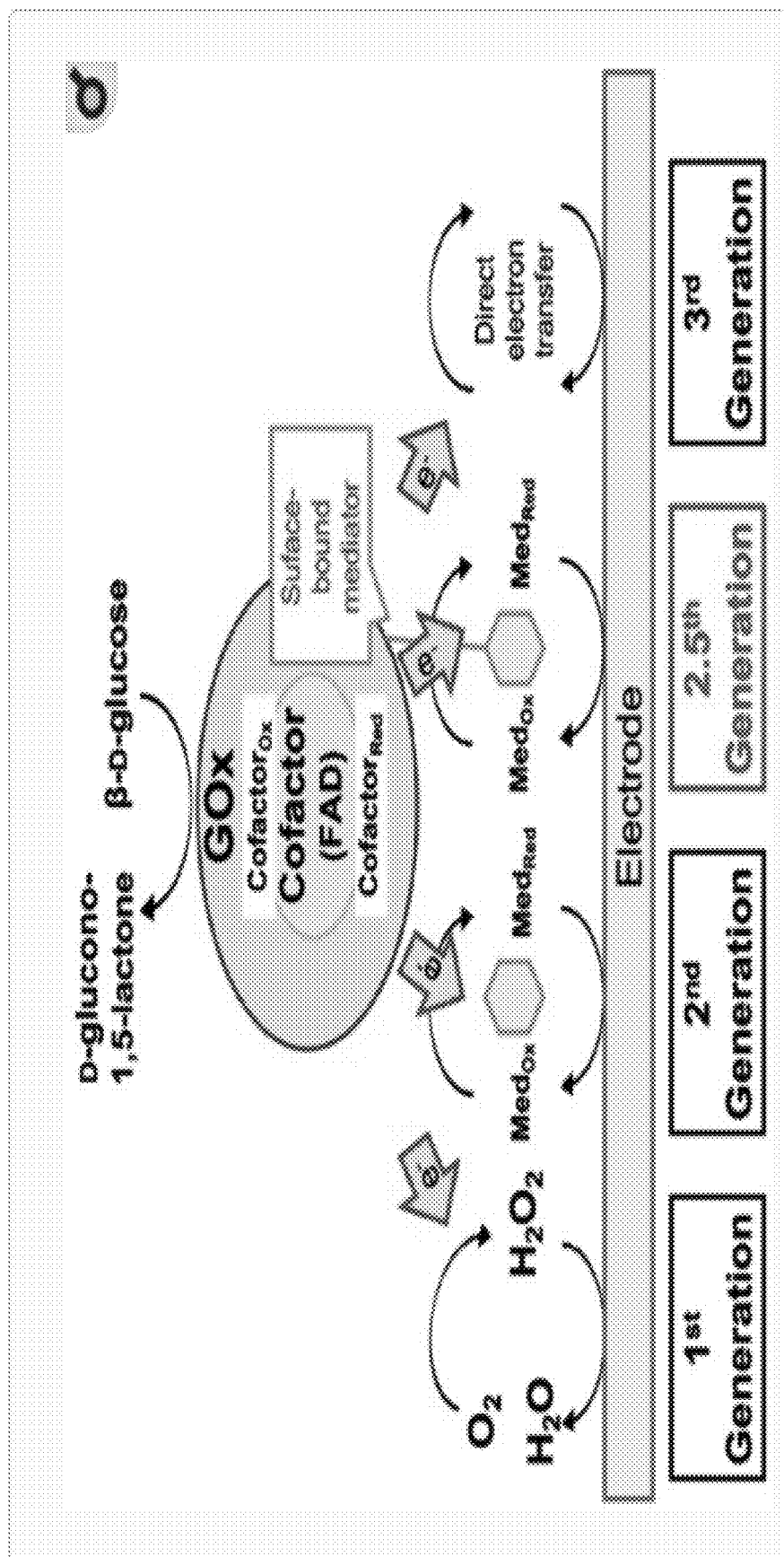
FIG. 5 provides a schematic showing mechanistic details of different generations (G) of glucose oxidase based electrochemical glucose sensors.
Figure 6:
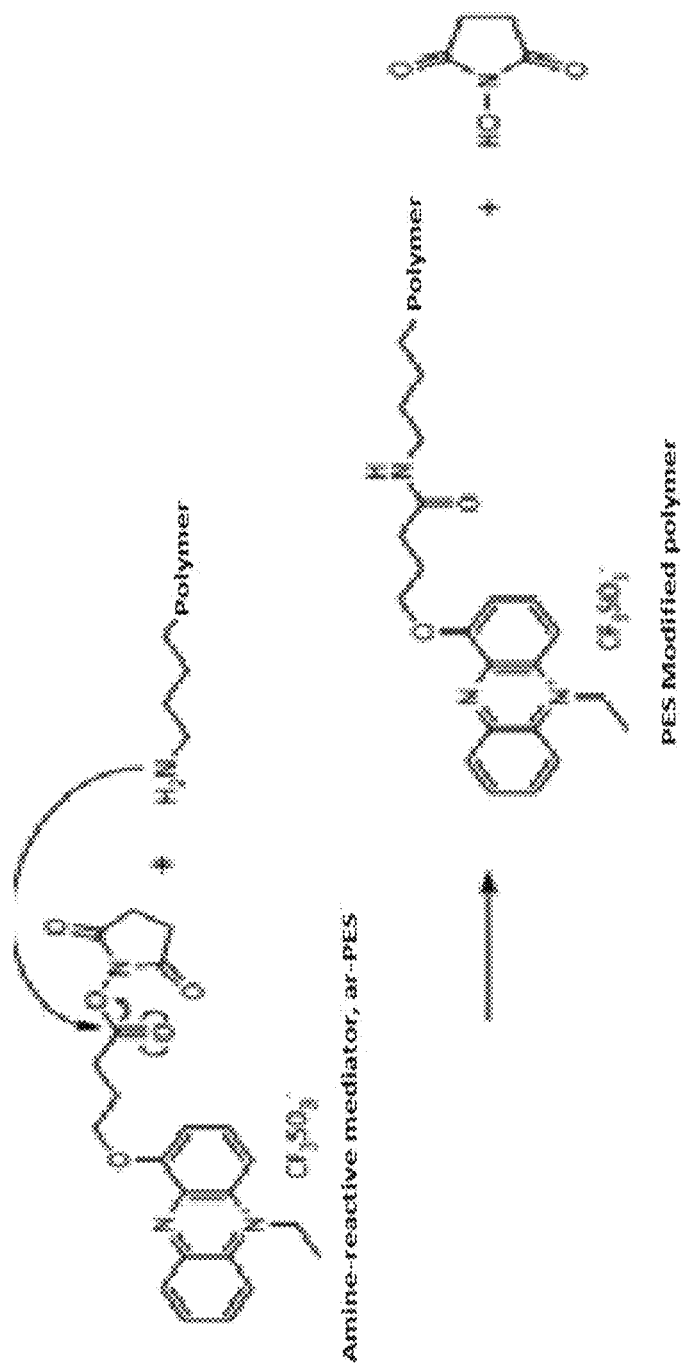
FIG. 6 provides a schematic showing the modification of primary amine on Lys residue by succinimide group of amine-reactive phenazine ethosulfate (Ar-PES) during preparation of PES modified polymers.
Figure 7:
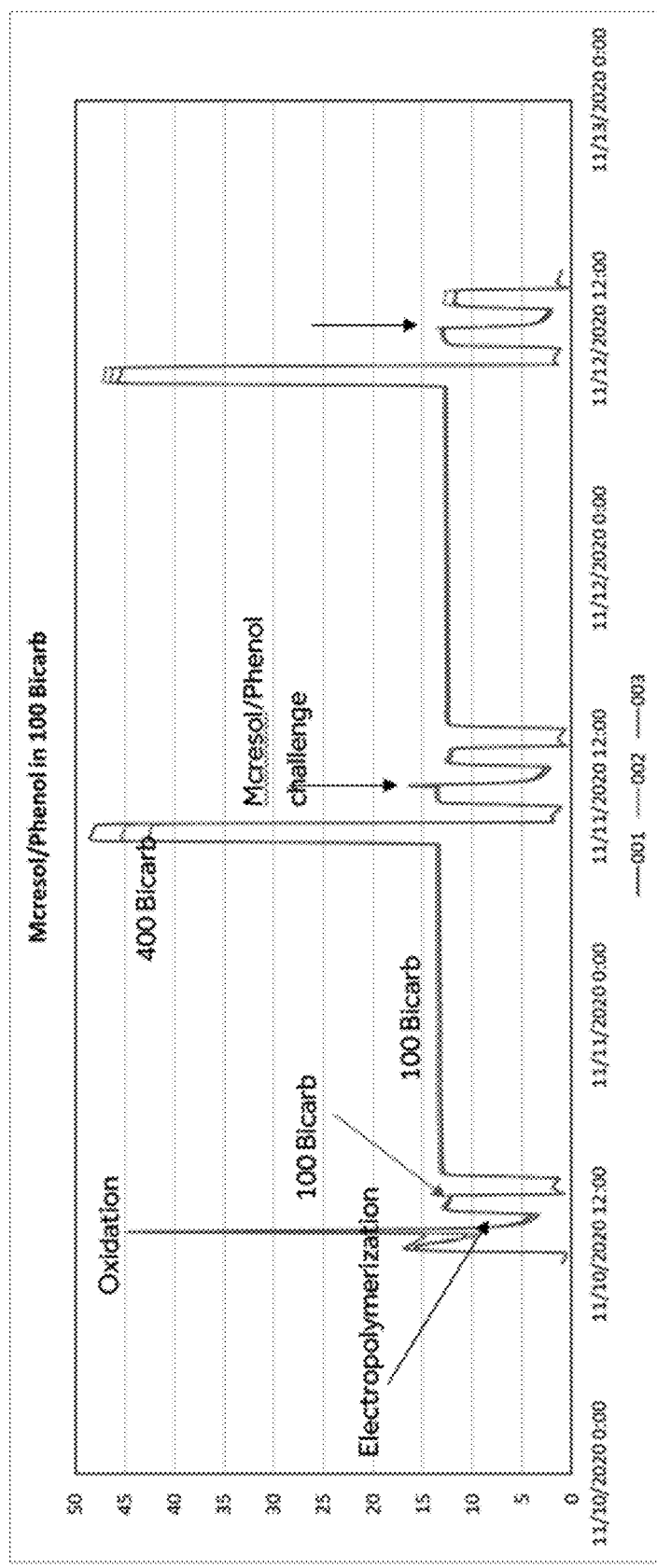
FIG. 7 shows graphed data of changes in signals that approximate an interstitial glucose reading (Isig) in a glucose sensor exposed to the interferents m-cresol and phenol.
Figure 8:
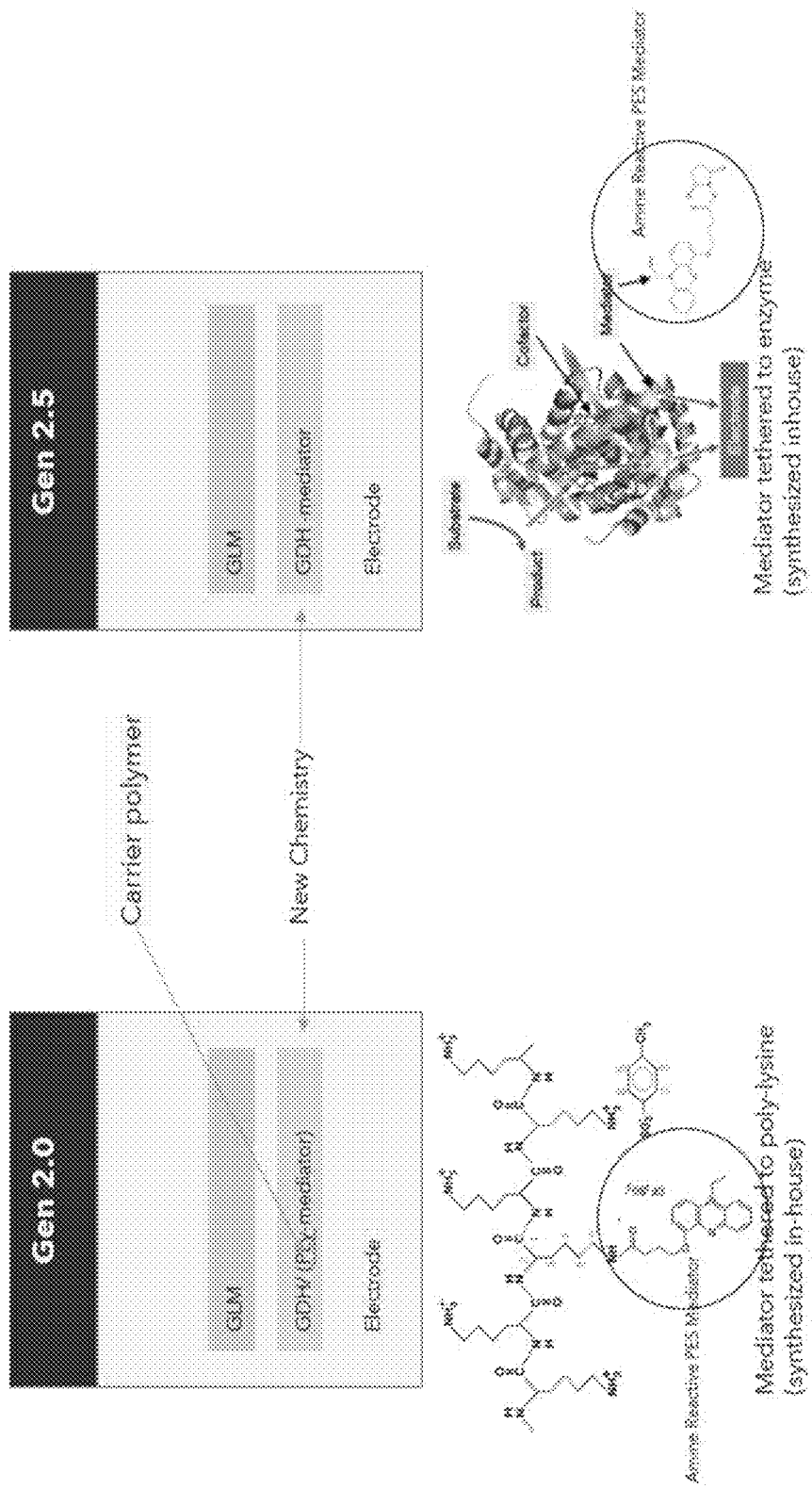
FIG. 8 provides a schematic showing two sensor embodiments, a first embodiment (left panel) where a mediator is tethered to a polymer (Poly-lysine) and a second (right panel) where a mediator is tethered directly to an enzyme. In this figure, the sensor layer architectures are shown above cartoons illustrating how the mediator is tethered/disposed in each sensor embodiment.

Certain conventional amperometric glucose sensors function by using relatively high electrical applied potentials, for example an applied potential around 535 mV (FIG. 4 shows a schematic of a potentiostat of the type useful in embodiments of the present invention). Unfortunately, at this relatively high potential (e.g. above 200 mV), such sensors can generate signals not only in response to sensed analytes such as glucose but also in response to interferents present in a fluid being sampled. Such interferants include certain drugs (e.g., acetaminophen), as well as compounds found in insulin formulations (e.g., m-cresol, phenol and glycerol). By using the mediators disclosed herein in the layered analyte materials of the sensors disclosed herein, the operating potential of such sensors can be dropped to below 300 mV or below 200 mV, thereby avoiding spurious signals generated by interferents.

Embodiments of the invention include, for example, methods of making an analyte sensor apparatus. Such methods typically comprise the steps of providing a base layer; forming a conductive layer on the base layer, wherein the conductive layer includes a working electrode. These methods further include forming an analyte sensing layer over the working electrode, wherein the analyte sensing layer comprises an enzyme selected to react with an analyte; and this enzyme is operatively coupled to a polymer functionalized with an agent selected to mediate reactivity of the enzyme with the analyte. The methods further include forming an analyte modulating layer over the analyte sensing layer, wherein the analyte modulating layer includes a composition that modulates the diffusion of the analyte therethrough.

A variety of materials can be used in various embodiments of the invention. In certain embodiments of the invention, the enzyme comprises a glucose dehydrogenase, a 3-hydroxybutyrate dehydrogenase, a lactate oxidase or a glucose oxidase. In certain embodiments, the agent comprises a mediator such as an amine Reactive Phenazine Ethosulphate "AR-PES", (IUPAC name 1-[3-(Succinimidyloxycarbonyl)propoxy]-5-ethylphenazinium triflate). For example, in certain embodiments of the invention, a AR-PES mediator can be attached to an amine functional polymer. Following separation and purification after the mediator polymer attachment reaction, the mediator/polymer can be crosslinked with enzyme system such as GDH (glucose dehydrogenase) so as to facilitate electron transfer from glucose to electrode. In certain embodiments, a carbon electrode can be used as the primary working electrode (e.g. a commercial screen printed carbon electrode). The sensor working electrode operating potential can be set at 0.0 mV. At this operating potential, accurate glucose calibrations are observed.

Illustrative working embodiments of the invention use the mediator Amine Reactive Phenazine Ethosulphate (Ar-PES), IUPAC name 1-[3-(Succinimidyloxycarbonyl) propoxy]-5-ethylphenazinium triflate. Typically in the sensors of the invention, AR-PES is coupled to amine functional polymers such as polylysine polymers which can also be crosslinked further with enzymes such FAD dependent GDH (or NAD dependent 3-Hydroxybutyrate dehydrogenase) to form a mediator/enzyme system, one which can transfer electrons from an analyte enzyme reaction to an electrode in sensors designed to function with a lower working electrical potential. In embodiments of the invention, the mediator/enzyme system is typically deposited on substrates comprising a working electrode made of carbon (or other materials). The modified enzyme layer is then coated with and outer diffusion control membrane (GLM). The operating potential used in such sensors can then range from about −200 mV up to +100 mV (e.g., 0 mV), a range where signals generated by interfering species are not observed. Such sensors further show linear response to glucose challenges. The mediator/polymer systems disclosed herein can also be used in other enzyme system such as glucose oxidase, lactate oxidase or other dehydrogenase system. Importantly, the mediator/enzyme systems disclosed herein can with stand ETO sterilization without significantly compromising sensor operability.

Other mediators useful in embodiments of the sensors include: Ferrocenecarboxaldehyde, 1,1'-Ferrocenedicarboxaldehyde, Ru(bpy)2(mcbpy-O-Su-ester)(PF6)2 [Bis(2,2'-bipyridine)-4'-methyl-4-carboxybipyridine-ruthenium N-succinimidyl ester-bis(hexafluorophosphate)]:

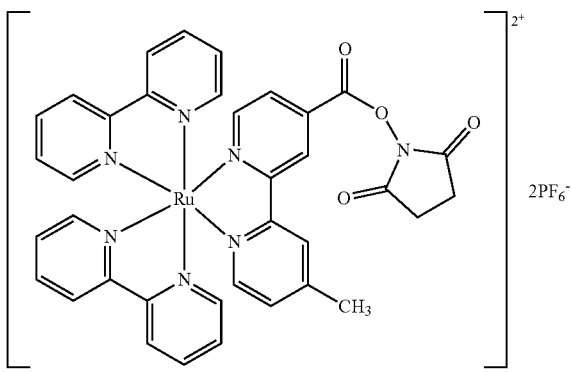

In embodiments of the invention, the polymer can comprise a polylysine polymer; a polyallylamine polymer; a polyethylene glycol polymer; a polyethyleneimine polymer, or the like. Illustrative embodiments of the invention include poly-l-lysine having molecular weights between 3 kd and 300 kd (e.g. polylysine polymers having molecular weights from 150 kd to 300 kd, Sigma P1399).

In certain embodiments of the invention, the analyte sensing layer is operably coupled to a flavin adenine dinucleotide or a nicotinamide adenine dinucleotide. Optionally, a mediator is coupled to amine functionalized polymers, wherein said polymers are further crosslinked with the enzyme in a manner that facilitates electron transfer from an enzyme-analyte reaction to the working electrode. In certain embodiments of the invention, the working electrode is formed from a carbon composition. In addition, these methods of the invention can further comprise sterilizing the analyte sensor apparatus using a sterilization process that includes exposing the analyte sensor apparatus to an ethylene oxide gas.

Mediators can be attached to different polymer carriers according to conventional processes. In typical embodiments of the invention, a polymer is water soluble and the pH of the solution can be selected to have pH=7.4 to 8.3 in order to make sure the amine group at its appropriate format for further reaction. A mediator such as AR-PES can be dissolved in pH=8.3 tricine buffer initially. Mixing and reacting can then take place at its appropriate ratio under shaking on a shaker (e.g., for 2 hours at ambient conditions). Removing non-reacted PES after such as reaction can proceed inside a low temperature centrifuge for 5-10 minutes @12000 rpm with Millipore UFC501024 centrifugal filter of mw cutoff at 10 kd. The top part solution can be collected when the bottom solution becomes clear without purple color. The final mediator solution can be adjusted to pH 7.0-7.4 range. For mediator/Enzyme membrane chemistry, preparation procedures follow conventional processes. For example, the mediator solution can be mixed with enzyme solution FAD-GDH @pH=7.0 with required concentration ratio prior disposed on test strip WE location. Dried matrices can be put into a glutaraldehyde vapor chamber for 20-40 minutes for further CVD crosslinking to immobilize enzyme/mediator matrix. A glucose diffusion limiting membrane can be coated further on top of these matrices with a spin coater at 500 rpm. In one illustrative embodiment, the solution can be 4% cellulose acetate in nitromethane.

One illustrative process for attaching mediator, amine-reactive Phenazine Ethosulfate (Ar-PES), is preformed through primary amine group reaction with succinimide group to bind mediator into the enzyme GDH. In this embodiment, several amine functional polymers shown in FIG. 1 were selected to bind PES mediator to the carrier polymers and electrochemical responses for a glucose sensor was evaluated, and signal stability was monitored as well. The polymer with highest response signal and best signal stability is chosen as further mediator study for in vitro and in vivo experiments Embodiments of the invention include analyte sensor apparatuses comprising the constellations of elements disclosed herein. Typically, such analyte sensor apparatuses comprise a base layer; a conductive layer disposed on the base layer, wherein the conductive layer includes a working electrode; an analyte sensing layer disposed on the working electrode, wherein the analyte sensing layer comprises an enzyme selected to react with the analyte; and is operatively coupled to a polymer functionalized with an agent selected to mediate reactivity of the enzyme (e.g. "AR-PES" 1-[3-(Succinimidyloxycarbonyl)propoxy]-5-ethylphenazinium triflate); and an analyte modulating layer disposed on the analyte sensing layer, wherein the analyte modulating layer includes a composition that modulates the diffusion of the analyte therethrough. In such analyte sensor apparatuses, the enzyme can comprise a glucose dehydrogenase, a 3-hydroxybutyrate dehydrogenase, a lactate oxidase, a glucose oxidase or the like. In such analyte sensor apparatuses, the polymer can comprise a polypeptide polymer, a polylysine polymer; a polyallylamine polymer; a polyethylene glycol polymer; a polyethyleneimine polymer or the like. In certain embodiments of such sensors, the analyte sensing layer is operably coupled to a flavin adenine dinucleotide or a nicotinamide adenine dinucleotide. In certain embodiments of such sensors, AR-PES is coupled to a polylysine that is crosslinked further with the enzyme in a manner that facilitates electron transfer from an analyte enzyme reaction to the working electrode (e.g. one formed from a carbon composition). In certain embodiments of the invention, such sensors are combined with an infusion apparatus (e.g. one comprising a needle or catheter that infuses insulin) in order to address problems associated with interference that results from additives present in insulin formulations (such as m-cresol, phenol, and glycerol).

Embodiments of the invention also include methods of estimating the concentrations of an analyte (e.g. glucose, lactate, 3-hydroxybutyrate or the like) in vivo. Typically, such methods include disposing an amperometric analyte sensor disclosed herein into an in vivo environment of a subject, wherein the environment comprises the analyte; and then estimating the concentration of the analyte; so that the concentrations of the analyte in vivo are estimated. In typical embodiments of these methods, the analyte sensor apparatus senses the analyte using an operating potential that is from −200 millivolts to +100 millivolts (e.g. 0 millivolts).

In certain embodiments of the invention, the analyte sensing layer comprises an oxidoreductase (e.g. glucose oxidase) that generates hydrogen peroxide upon exposure to a substrate for the oxidoreductase (e.g. glucose), wherein the amount of hydrogen peroxide generated by the oxidoreductase is proportional to the amount of substrate exposed to the oxidoreductase. Optionally, such embodiments of the invention further include: a protein layer disposed on the analyte sensing layer; an analyte modulating layer disposed on the analyte sensing layer or the protein layer, wherein the analyte modulating layer comprises a composition that modulates the diffusion of an analyte such as glucose diffusing through the analyte modulating layer; an adhesion promoting layer disposed on the analyte sensing layer, wherein the adhesion promoting layer promotes the adhesion between the analyte sensing layer and an analyte modulating layer; or a cover layer disposed on the analyte sensor apparatus, wherein the cover layer comprises an aperture positioned on the cover layer so as to facilitate an analyte present in the mammal accessing and diffusing through an analyte modulating layer; and accessing the analyte sensing layer.

In some embodiments of the invention, the conductive layer comprises a plurality of electrodes including the working electrode, a counter electrode and a reference electrode. Optionally, the conductive layer comprises a plurality of working electrodes, counter electrodes and reference electrodes; and the plurality of working, counter, and reference electrodes are grouped together as a unit and positionally distributed on the conductive layer in a repeating pattern of units. In some embodiments of the invention, the sensor is operatively coupled to: a sensor input capable of receiving a signal from the sensor that is based on a sensed physiological characteristic value in the mammal; and a processor coupled to the sensor input, wherein the processor is capable of characterizing one or more signals received from the sensor. In certain embodiments of the invention, a pulsed voltage is used to obtain a signal from an electrode.

A. Typical Sensor Architectures Found in Embodiments of the Invention

Figure 2A:
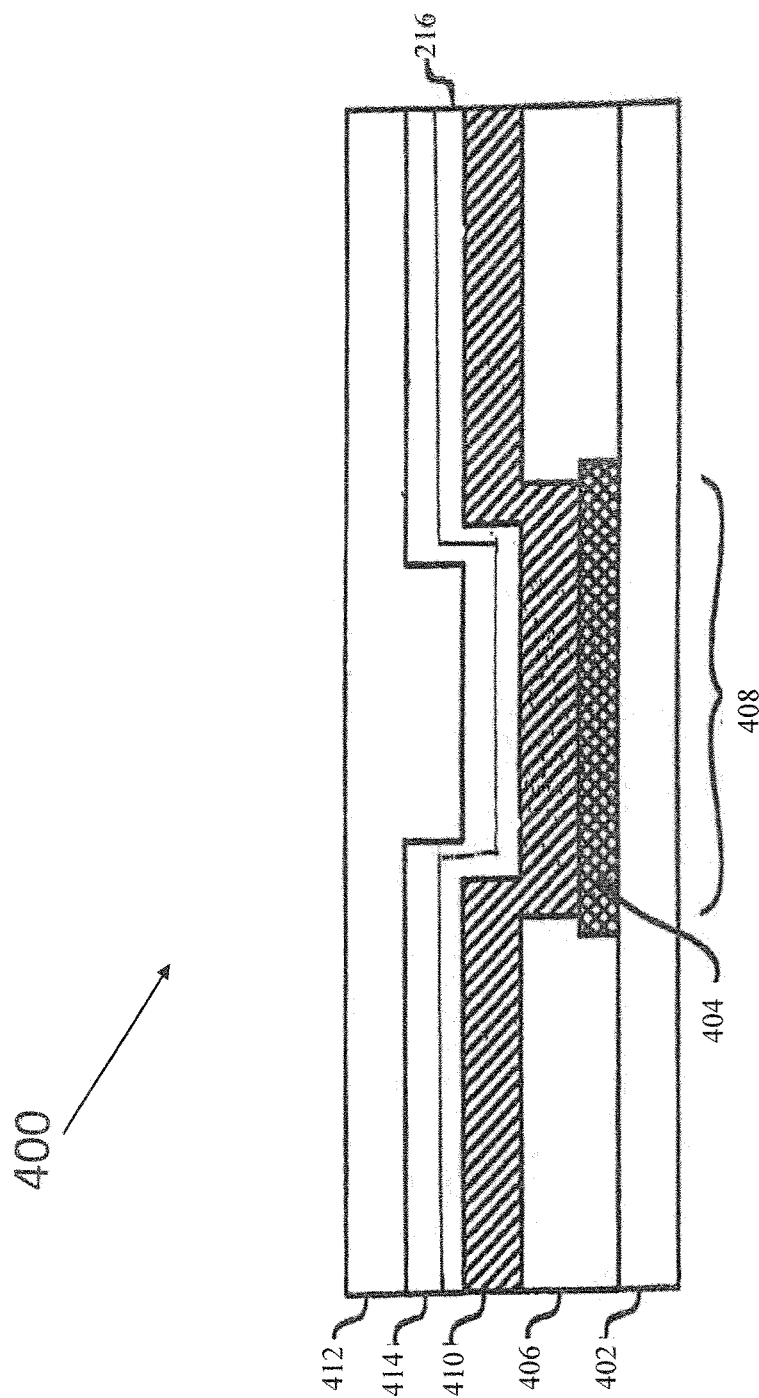
FIG. 2A provides a diagrammatic view of one embodiment of an amperometric analyte sensor to which elements disclosed herein such as a polymer functionalized with an agent selected to mediate reactivity of the enzyme with the analyte can be utilized.

FIG. 2A illustrates a cross-section of a typical sensor embodiment 400 of the present invention. This sensor embodiment is formed from a plurality of components that are typically in the form of layers of various conductive and non-conductive constituents disposed on each other according to art accepted methods and/or the specific methods of the invention disclosed herein. The components of the sensor are typically characterized herein as layers because, for example, it allows for a facile characterization of the sensor structure shown in FIG. 2. Artisans will understand however, that in certain embodiments of the invention, the sensor constituents are combined such that multiple constituents form one or more heterogeneous layers. In this context, those of skill in the art understand that the ordering of the layered constituents can be altered in various embodiments of the invention.

The embodiment shown in FIG. 2A includes a base layer 402 to support the sensor 400. The base layer 402 can be made of a material such as a metal and/or a ceramic and/or a polymeric substrate, which may be self-supporting or further supported by another material as is known in the art. Embodiments of the invention include a conductive layer 404 which is disposed on and/or combined with the base layer 402. Typically the conductive layer 404 comprises one or more electrodes. An operating sensor 400 typically includes a plurality of electrodes such as a working electrode, a counter electrode and a reference electrode. Other embodiments may also include a plurality of working and/or counter and/or reference electrodes and/or one or more electrodes that performs multiple functions, for example one that functions as both as a reference and a counter electrode.

As discussed in detail below, the base layer 402 and/or conductive layer 404 can be generated using many known techniques and materials. In certain embodiments of the invention, the electrical circuit of the sensor is defined by etching the disposed conductive layer 404 into a desired pattern of conductive paths. A typical electrical circuit for the sensor 400 comprises two or more adjacent conductive paths with regions at a proximal end to form contact pads and regions at a distal end to form sensor electrodes. An electrically insulating cover layer 406 such as a polymer coating can be disposed on portions of the sensor 400. Acceptable polymer coatings for use as the insulating protective cover layer 406 can include, but are not limited to, non-toxic biocompatible polymers such as silicone compounds, polyimides, biocompatible solder masks, epoxy acrylate copolymers, or the like. In the sensors of the present invention, one or more exposed regions or apertures 408 can be made through the cover layer 406 to open the conductive layer to the external environment and to, for example, allow an analyte such as glucose to permeate the layers of the sensor and be sensed by the sensing elements. Apertures 408 can be formed by a number of techniques, including laser ablation, tape masking, chemical milling or etching or photolithographic development or the like. In certain embodiments of the invention, during manufacture, a secondary photoresist can also be applied to the protective layer 406 to define the regions of the protective layer to be removed to form the aperture(s) 408. The exposed electrodes and/or contact pads can also undergo secondary processing (e.g. through the apertures 408), such as additional plating processing, to prepare the surfaces and/or strengthen the conductive regions.

In the sensor configuration shown in FIG. 2A, an analyte sensing layer 410 (which is typically a sensor chemistry layer, meaning that materials in this layer undergo a chemical reaction to produce a signal that can be sensed by the conductive layer) is disposed on one or more of the exposed electrodes of the conductive layer 404. Typically, the analyte sensing layer 410 is an enzyme layer. Most typically, the analyte sensing layer 410 comprises an enzyme capable of producing and/or utilizing oxygen and/or hydrogen peroxide, for example the enzyme glucose oxidase. Optionally, the enzyme in the analyte sensing layer is combined with a second carrier protein such as human serum albumin, bovine serum albumin or the like. In an illustrative embodiment, an oxidoreductase enzyme such as glucose oxidase in the analyte sensing layer 410 reacts with glucose to produce hydrogen peroxide, a compound which then modulates a current at an electrode. As this modulation of current depends on the concentration of hydrogen peroxide, and the concentration of hydrogen peroxide correlates to the concentration of glucose, the concentration of glucose can be determined by monitoring this modulation in the current. In a specific embodiment of the invention, the hydrogen peroxide is oxidized at a working electrode which is an anode (also termed herein the anodic working electrode), with the resulting current being proportional to the hydrogen peroxide concentration. Such modulations in the current caused by changing hydrogen peroxide concentrations can by monitored by any one of a variety of sensor detector apparatuses such as a universal sensor amperometric biosensor detector or one of the other variety of similar devices known in the art such as glucose monitoring devices produced by Medtronic™ MiniMed™.

In embodiments of the invention, the analyte sensing layer 410 can be applied over portions of the conductive layer or over the entire region of the conductive layer. Typically the analyte sensing layer 410 is disposed on the working electrode which can be the anode or the cathode. Optionally, the analyte sensing layer 410 is also disposed on a counter and/or reference electrode. While the analyte sensing layer 410 can be up to about 1000 microns (μm) in thickness, typically the analyte sensing layer is relatively thin as compared to those found in sensors previously described in the art, and is for example, typically less than 1, 0.5, 0.25 or 0.1 microns in thickness. As discussed in detail below, some methods for generating a thin analyte sensing layer 410 include brushing the layer onto a substrate (e.g. the reactive surface of a platinum black electrode), as well as spin coating processes, dip and dry processes, low shear spraying processes, ink-jet printing processes, silk screen processes and the like.

Typically, the analyte sensing layer 410 is coated and/or disposed next to one or more additional layers. Optionally, the one or more additional layers includes a protein layer 416 disposed upon the analyte sensing layer 410. Typically, the protein layer 416 comprises a protein such as human serum albumin, bovine serum albumin or the like. Typically, the protein layer 416 comprises human serum albumin. In some embodiments of the invention, an additional layer includes an analyte modulating layer 412 that is disposed above the analyte sensing layer 410 to regulate analyte access with the analyte sensing layer 410. For example, the analyte modulating membrane layer 412 can comprise a glucose limiting membrane, which regulates the amount of glucose that contacts an enzyme such as glucose oxidase that is present in the analyte sensing layer. Such glucose limiting membranes can be made from a wide variety of materials known to be suitable for such purposes, e.g., silicone compounds such as polydimethyl siloxanes, polyurethanes, polyurea cellulose acetates, NAFION, polyester sulfonic acids (e.g. Kodak AQ), hydrogels or any other suitable hydrophilic membranes known to those skilled in the art.

Figure 2B:
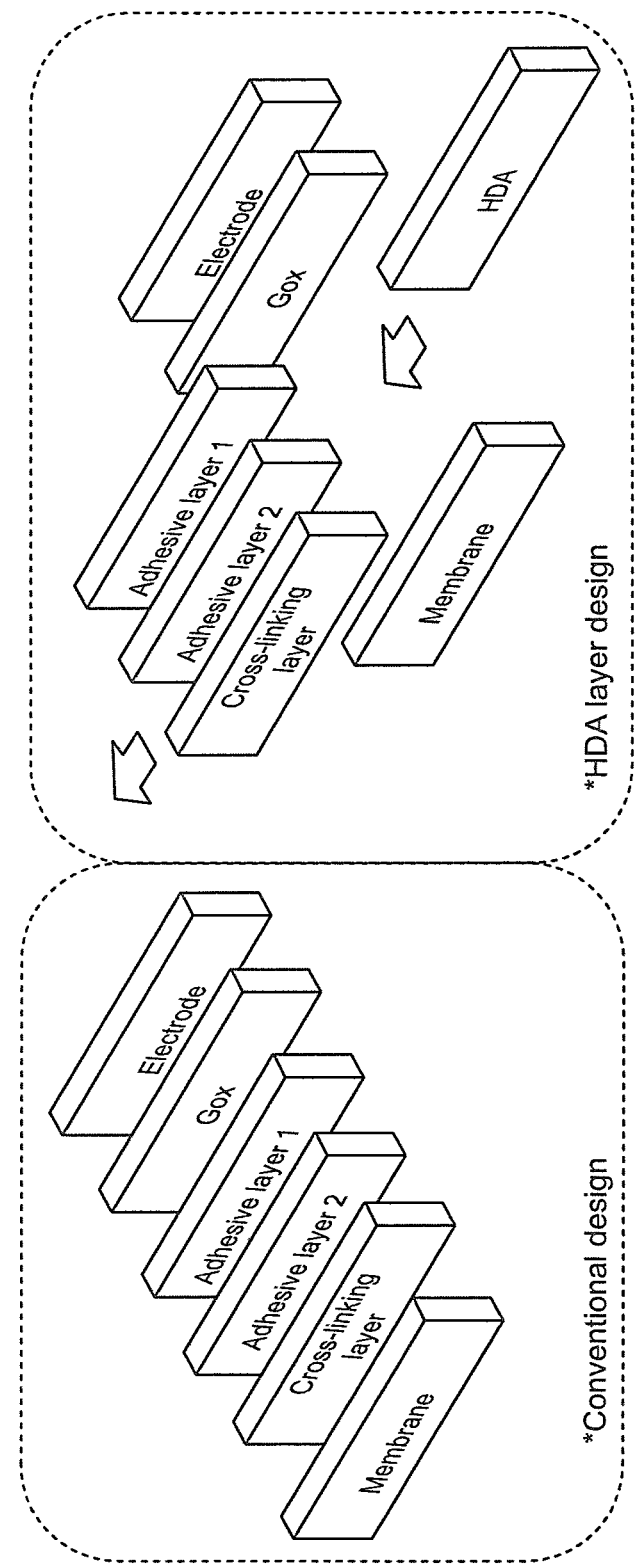
FIG. 2B provides a diagrammatic view of one embodiment of an amperometric analyte sensor having a high density amine layer.
Figure 2C:
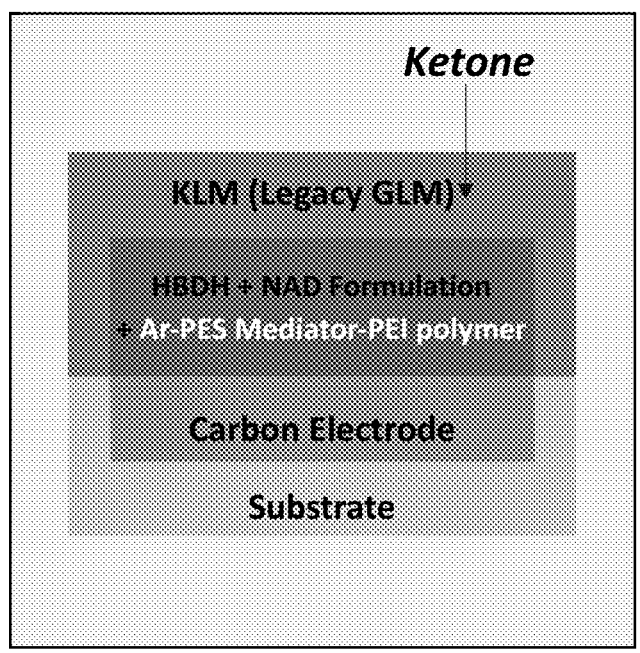
FIG. 2C provides a diagrammatic view of one embodiment of an amperometric analyte sensor having a plurality of layered elements including a substrate upon which a carbon electrode is disposed, with this electrode then coated by a material that includes an enzyme (e.g. 3-hydroxybutyrate dehydrogenase "HBDH") and a cofactor (e.g. NAD), a mediator (e.g., Ar-PES) and a polymer (e.g. polyethylenimine) that is coupled to these reactants. This material is then coated with a analyte (e.g. ketone or glucose) limiting membrane (KLM or GLM).

In typical embodiments of the invention, an adhesion promoter layer 414 is disposed between the analyte modulating layer 412 and the analyte sensing layer 410 as shown in FIG. 2 in order to facilitate their contact and/or adhesion. In a specific embodiment of the invention, an adhesion promoter layer 414 is disposed between the analyte modulating layer 412 and the protein layer 416 as shown in FIG. 2 in order to facilitate their contact and/or adhesion. The adhesion promoter layer 414 can be made from any one of a wide variety of materials known in the art to facilitate the bonding between such layers. Typically, the adhesion promoter layer 414 comprises a silane compound. In alternative embodiments, protein or like molecules in the analyte sensing layer 410 can be sufficiently crosslinked or otherwise prepared to allow the analyte modulating membrane layer 412 to be disposed in direct contact with the analyte sensing layer 410 in the absence of an adhesion promoter layer 414.

Embodiments of typical elements used to make the sensors disclosed herein are discussed below.

B. Typical Analyte Sensor Constituents Used in Embodiments of the Invention

The following disclosure provides examples of typical elements/constituents used in sensor embodiments of the invention. While these elements can be described as discreet units (e.g. layers), those of skill in the art understand that sensors can be designed to contain elements having a combination of some or all of the material properties and/or functions of the elements/constituents discussed below (e.g. an element that serves both as a supporting base constituent and/or a conductive constituent and/or a matrix for the analyte sensing constituent and which further functions as an electrode in the sensor). Those in the art understand that these thin film analyte sensors can be adapted for use in a number of sensor systems such as those described herein.

Base Constituent

Sensors of the invention typically include a base constituent (see, e.g. element 402 in FIG. 2A). The term "base constituent" is used herein according to art accepted terminology and refers to the constituent in the apparatus that typically provides a supporting matrix for the plurality of constituents that are stacked on top of one another and comprise the functioning sensor. In one form, the base constituent comprises a thin film sheet of insulative (e.g. electrically insulative and/or water impermeable) material. This base constituent can be made of a wide variety of materials having desirable qualities such as dielectric properties, water impermeability and hermeticity. Some materials include metallic, and/or ceramic and/or polymeric substrates or the like.

The base constituent may be self-supporting or further supported by another material as is known in the art. In one embodiment of the sensor configuration shown in FIG. 2A, the base constituent 402 comprises a ceramic. Alternatively, the base constituent comprises a polymeric material such as a polyimmide. In an illustrative embodiment, the ceramic base comprises a composition that is predominantly $Al_2O_3$ (e.g. 96%). The use of alumina as an insulating base constituent for use with implantable devices is disclosed in U.S. Pat. Nos. 4,940,858, 4,678,868 and 6,472,122 which are incorporated herein by reference. The base constituents of the invention can further include other elements known in the art, for example hermetical vias (see, e.g. WO 03/023388). Depending upon the specific sensor design, the base constituent can be relatively thick constituent (e.g. thicker than 50, 100, 200, 300, 400, 500 or 1000 microns). Alternatively, one can utilize a nonconductive ceramic, such as alumina, in thin constituents, e.g., less than about 30 microns.

Conductive Constituent

The electrochemical sensors of the invention typically include a conductive constituent disposed upon the base constituent that includes at least one electrode for measuring an analyte or its byproduct (e.g. oxygen and/or hydrogen peroxide) to be assayed (see, e.g. element 404 in FIG. 2A). The term "conductive constituent" is used herein according to art accepted terminology and refers to electrically conductive sensor elements such as electrodes which are capable of measuring and a detectable signal and conducting this to a detection apparatus. An illustrative example of this is a conductive constituent that can measure an increase or decrease in current in response to exposure to a stimuli such as the change in the concentration of an analyte or its byproduct as compared to a reference electrode that does not experience the change in the concentration of the analyte, a coreactant (e.g. oxygen) used when the analyte interacts with a composition (e.g. the enzyme glucose oxidase) present in analyte sensing constituent 410 or a reaction product of this interaction (e.g. hydrogen peroxide). Illustrative examples of such elements include electrodes which are capable of producing variable detectable signals in the presence of variable concentrations of molecules such as hydrogen peroxide or oxygen. Typically one of these electrodes in the conductive constituent is a working electrode, which can be made from non-corroding metal or carbon. A carbon working electrode may be vitreous or graphitic and can be made from a solid or a paste. A metallic working electrode may be made from platinum group metals, including palladium or gold, or a non-corroding metallically conducting oxide, such as ruthenium dioxide. Alternatively the electrode may comprise a silver/silver chloride electrode composition. The working electrode may be a wire or a thin conducting film applied to a substrate, for example, by coating or printing. Typically, only a portion of the surface of the metallic or carbon conductor is in electrolytic contact with the analyte-containing solution. This portion is called the working surface of the electrode. The remaining surface of the electrode is typically isolated from the solution by an electrically insulating cover constituent 406. Examples of useful materials for generating this protective cover constituent 406 include polymers such as polyimides, polytetrafluoroethylene, polyhexafluoropropylene and silicones such as polysiloxanes.

In addition to the working electrode, the analyte sensors of the invention typically include a reference electrode or a combined reference and counter electrode (also termed a quasi-reference electrode or a counter/reference electrode). If the sensor does not have a counter/reference electrode then it may include a separate counter electrode, which may be made from the same or different materials as the working electrode. Typical sensors of the present invention have one or more working electrodes and one or more counter, reference, and/or counter/reference electrodes. One embodiment of the sensor of the present invention has two, three or four or more working electrodes. These working electrodes in the sensor may be integrally connected or they may be kept separate.

Typically for in vivo use, embodiments of the present invention are implanted subcutaneously in the skin of a mammal for direct contact with the body fluids of the mammal, such as blood. Alternatively the sensors can be implanted into other regions within the body of a mammal such as in the intraperotineal space. When multiple working electrodes are used, they may be implanted together or at different positions in the body. The counter, reference, and/or counter/reference electrodes may also be implanted either proximate to the working electrode(s) or at other positions within the body of the mammal. Embodiments of the invention include sensors comprising electrodes constructed from nanostructured materials. As used herein, a "nanostructured material" is an object manufactured to have at least one dimension smaller than 100 nm. Examples include, but are not limited to, single-walled nanotubes, double-walled nanotubes, multi-walled nanotubes, bundles of nanotubes, fullerenes, cocoons, nanowires, nanofibres, onions and the like.

Interference Rejection Constituent

The electrochemical sensors of the invention typically include an interference rejection constituent disposed between the surface of the electrode and the environment to be assayed. In particular, certain sensor embodiments rely on the oxidation and/or reduction of hydrogen peroxide generated by enzymatic reactions on the surface of a working electrode at a constant potential applied. Because amperometric detection based on direct oxidation of hydrogen peroxide requires a relatively high oxidation potential, sensors employing this detection scheme may suffer interference from oxidizable species that are present in biological fluids, such as ascorbic acid, uric acid and acetaminophen. In this context, the term "interference rejection constituent" is used herein according to art accepted terminology and refers to a coating or membrane in the sensor that functions to inhibit spurious signals generated by such oxidizable species which interfere with the detection of the signal generated by the analyte to be sensed. Certain interference rejection constituents function via size exclusion (e.g. by excluding interfering species of a specific size).

Typically, the interference rejection constituent comprises crosslinked poly(vinyl alcohol) (PVA) polymers. Other examples of interference rejection constituents include one or more layers or coatings of compounds such as the hydrophilic crosslinked pHEMA polymers, polylysine polymers, cellulose acetate (including cellulose acetate incorporating agents such as poly(ethylene glycol)), polyethersulfones, polytetra-fluoroethylenes, the perfluoronated ionomer NAFION™, polyphenylenediamine, epoxy and the like. Illustrative discussions of such interference rejection constituents are found for example in Ward et al., Biosensors and Bioelectronics 17 (2002) 181-189 and Choi et al., Analytical Chimica Acta 461 (2002) 251-260 which are incorporated herein by reference. Other interference rejection constituents include for example those observed to limit the movement of compounds based upon a molecular weight range, for example cellulose acetate as disclosed for example in U.S. Pat. No. 5,755,939, the contents of which are incorporated by reference.

Typically, the crosslinker is a dicarboxylic acid type monomer or a polymer comprising a carboxylic acid group. In certain instances, the crosslinker is sulfosuccinic acid (SSA), which has been demonstrated to be a very efficient crosslinker suitable for use with PVA. In another instance, the crosslinker is poly(methyl vinyl ether-alt-maleic acid), which has also been found to be suitable for use with PVA. Other suitable crosslinkers include maleic acid, citric acid, oxalic acid, fumaric acid, poly(acrylic acid), poly(acrylic acid-co-maleic acid) (PAM), succinic acid, and malonic acid.

In certain embodiments of the invention, the specific placement of the interference rejection membrane element relative to other sensor elements is used to effect its function. For example, in sensor embodiments where the disclosed crosslinked polymeric compositions are disposed directly on the electroactive surface of the electrode, they function to provide size-exclusion based interference rejection membranes, ones which inhibit the diffusion of interfering species while simultaneously allowing $H_2O_2$ produced from an analyte enzyme reaction to access the electrode and generate an appropriate signal. Moreover, as noted above, poly(vinyl alcohol) (PVA) polymers crosslinked by an acid crosslinker further provides an optimized hydrophilic environment so as to expedite the sensor initial hydration speed. Such polymers also offer a compatible matrix for a subsequent layer such as an enzyme layer (e.g. one comprising glucose oxidase) to be adhered to. Consequently, the crosslinked polymeric compositions disclosed herein exhibit a surprising constellation of material properties that make them ideal for use with certain sensor designs (e.g. implantable amperometric glucose sensors comprising a platinum back electrode surfaces upon which a plurality of functional coatings are disposed). This unexpected constellation of material properties includes, for example, an ability to facilitate sensor hydration (thereby decreasing start-up time), an ability to facilitate adhesion of the sensor layers so as to provide a stabilized sensor (and output signal) as well as an ability to inhibit spurious sensor signals caused by interfering species during sensor operation.

Analyte Sensing Constituent

The electrochemical sensors of the invention include an analyte sensing constituent disposed on the electrodes of the sensor (see, e.g. element 410 in FIG. 2A). The term "analyte sensing constituent" is used herein according to art accepted terminology and refers to a constituent comprising a material that is capable of recognizing or reacting with an analyte whose presence is to be detected by the analyte sensor apparatus. Typically this material in the analyte sensing constituent produces a detectable signal after interacting with the analyte to be sensed, typically via the electrodes of the conductive constituent. In this regard the analyte sensing constituent and the electrodes of the conductive constituent work in combination to produce the electrical signal that is read by an apparatus associated with the analyte sensor. Typically, the analyte sensing constituent comprises an oxidoreductase enzyme capable of reacting with and/or producing a molecule whose change in concentration can be measured by measuring the change in the current at an electrode of the conductive constituent (e.g. oxygen and/or hydrogen peroxide), for example the enzyme glucose oxidase. An enzyme capable of producing a molecule such as hydrogen peroxide can be disposed on the electrodes according to a number of processes known in the art. The analyte sensing constituent can coat all or a portion of the various electrodes of the sensor. In this context, the analyte sensing constituent may coat the electrodes to an equivalent degree. Alternatively the analyte sensing constituent may coat different electrodes to different degrees, with, for example, the coated surface of the working electrode being larger than the coated surface of the counter and/or reference electrode.

Typical sensor embodiments of this element of the invention utilize an enzyme (e.g. glucose oxidase) that has been combined with a second protein (e.g. albumin) in a fixed ratio (e.g. one that is typically optimized for glucose oxidase stabilizing properties) and then applied on the surface of an electrode to form a thin enzyme constituent. In a typical embodiment, the analyte sensing constituent comprises a GOx and HSA mixture. In a typical embodiment of an analyte sensing constituent having GOx, the GOx reacts with glucose present in the sensing environment (e.g. the body of a mammal) and generates hydrogen peroxide according to the reaction shown in FIG. 1, wherein the hydrogen peroxide so generated is anodically detected at the working electrode in the conductive constituent.

As noted above, the enzyme and the second protein (e.g. an albumin) are typically treated to form a crosslinked matrix (e.g. by adding a cross-linking agent to the protein mixture). As is known in the art, crosslinking conditions may be manipulated to modulate factors such as the retained biological activity of the enzyme, its mechanical and/or operational stability. Illustrative crosslinking procedures are described in U.S. patent application Ser. No. 10/335,506 and PCT publication WO 03/035891 which are incorporated herein by reference. For example, an amine cross-linking reagent, such as, but not limited to, glutaraldehyde, can be added to the protein mixture.

Protein Constituent

The electrochemical sensors of the invention optionally include a protein constituent disposed between the analyte sensing constituent and the analyte modulating constituent (see, e.g. element 416 in FIG. 2A). The term "protein constituent" is used herein according to art accepted terminology and refers to a constituent containing a carrier protein or the like that is selected for compatibility with the analyte sensing constituent and/or the analyte modulating constituent. In typical embodiments, the protein constituent comprises an albumin such as human serum albumin. The HSA concentration may vary between about 0.5%-30% (w/v). Typically the HSA concentration is about 1-10% w/v, and most typically is about 5% w/v. In alternative embodiments of the invention, collagen or BSA or other structural proteins used in these contexts can be used instead of or in addition to HSA. This constituent is typically crosslinked on the analyte sensing constituent according to art accepted protocols.

Adhesion Promoting Constituent

The electrochemical sensors of the invention can include one or more adhesion promoting (AP) constituents (see, e.g. element 414 in FIG. 2A). The term "adhesion promoting constituent" is used herein according to art accepted terminology and refers to a constituent that includes materials selected for their ability to promote adhesion between adjoining constituents in the sensor. Typically, the adhesion promoting constituent is disposed between the analyte sensing constituent and the analyte modulating constituent. Typically, the adhesion promoting constituent is disposed between the optional protein constituent and the analyte modulating constituent. The adhesion promoter constituent can be made from any one of a wide variety of materials known in the art to facilitate the bonding between such constituents and can be applied by any one of a wide variety of methods known in the art. Typically, the adhesion promoter constituent comprises a silane compound such as γ-aminopropyltrimethoxysilane.

The use of silane coupling reagents, especially those of the formula $R'Si(OR)_3$ in which $R'$ is typically an aliphatic group with a terminal amine and R is a lower alkyl group, to promote adhesion is known in the art (see, e.g. U.S. Pat. No. 5,212,050 which is incorporated herein by reference). For example, chemically modified electrodes in which a silane such as γ-aminopropyltriethoxysilane and glutaraldehyde were used in a step-wise process to attach and to co-crosslink bovine serum albumin (BSA) and glucose oxidase ($GO_x$) to the electrode surface are well known in the art (see, e.g. Yao, T. Analytica Chim. Acta 1983, 148, 27-33).

In certain embodiments of the invention, the adhesion promoting constituent further comprises one or more compounds that can also be present in an adjacent constituent such as the polydimethyl siloxane (PDMS) compounds that serves to limit the diffusion of analytes such as glucose through the analyte modulating constituent. In illustrative embodiments the formulation comprises 0.5-20% PDMS, typically 5-15% PDMS, and most typically 10% PDMS. In certain embodiments of the invention, the adhesion promoting constituent is crosslinked within the layered sensor system and correspondingly includes an agent selected for its ability to crosslink a moiety present in a proximal constituent such as the analyte modulating constituent. In illustrative embodiments of the invention, the adhesion promoting constituent includes an agent selected for its ability to crosslink an amine or carboxyl moiety of a protein present in a proximal constituent such as the analyte sensing constituent and/or the protein constituent and/or a siloxane moiety present in a compound disposed in a proximal layer such as the analyte modulating layer.

High-Density Amine Constituent

The electrochemical sensors of the invention can include one or more high-density amine constituent layers that provide the sensors with a number of beneficial functions. Such layers can optimize sensor function, for example by acting as an adhesion promoting constituent for layers adjacent to the HDA layer, by decreasing fluctuations that can occur in glucose sensors by improving sensor initialization profiles and the like. Typically, the high-density amine constituent is disposed between and in direct contact with the analyte sensing constituent and the analyte modulating constituent. In typical embodiments, the high-density amine layer comprises poly-l-lysine having molecular weights between 30 KDa and 300 KDa (e.g. between 150 KDa and 300 KDa). The concentrations of poly-l-lysine in such high-density amine layers is typically from 0.1 weight-to-weight percent to 0.5 weight-to-weight percent and the high-density amine layer 500 is from 0.1 to 0.4 microns thick.

Analyte Modulating Constituent

The electrochemical sensors of the invention include an analyte modulating constituent disposed on the sensor (see, e.g. element 412 in FIG. 2A). The term "analyte modulating constituent" is used herein according to art accepted terminology and refers to a constituent that typically forms a membrane on the sensor that operates to modulate the diffusion of one or more analytes, such as glucose, through the constituent. In certain embodiments of the invention, the analyte modulating constituent is an analyte-limiting membrane (e.g. a glucose limiting membrane) which operates to prevent or restrict the diffusion of one or more analytes, such as glucose, through the constituents. In other embodiments of the invention, the analyte-modulating constituent operates to facilitate the diffusion of one or more analytes, through the constituents. Optionally such analyte modulating constituents can be formed to prevent or restrict the diffusion of one type of molecule through the constituent (e.g. glucose), while at the same time allowing or even facilitating the diffusion of other types of molecules through the constituent (e.g. $O_2$).

With respect to glucose sensors, in known enzyme electrodes, glucose and oxygen from blood, as well as some interferents, such as ascorbic acid and uric acid, diffuse through a primary membrane of the sensor. As the glucose, oxygen and interferents reach the analyte sensing constituent, an enzyme, such as glucose oxidase, catalyzes the conversion of glucose to hydrogen peroxide and gluconolactone. The hydrogen peroxide may diffuse back through the analyte modulating constituent, or it may diffuse to an electrode where it can be reacted to form oxygen and a proton to produce a current that is proportional to the glucose concentration. The sensor membrane assembly serves several functions, including selectively allowing the passage of glucose therethrough. In this context, an illustrative analyte modulating constituent is a semi-permeable membrane which permits passage of water, oxygen and at least one selective analyte and which has the ability to absorb water, the membrane having a water soluble, hydrophilic polymer.

A variety of illustrative analyte modulating compositions are known in the art and are described for example in U.S. Pat. Nos. 6,319,540, 5,882,494, 5,786,439 5,777,060, 5,771, 868 and 5,391,250, the disclosures of each being incorporated herein by reference. The hydrogels described therein are particularly useful with a variety of implantable devices for which it is advantageous to provide a surrounding water constituent. In some embodiments of the invention, the analyte modulating composition includes PDMS. In certain embodiments of the invention, the analyte modulating constituent includes an agent selected for its ability to crosslink a siloxane moiety present in a proximal constituent. In closely related embodiments of the invention, the adhesion promoting constituent includes an agent selected for its ability to crosslink an amine or carboxyl moiety of a protein present in a proximal constituent.

Cover Constituent

Figure 3:
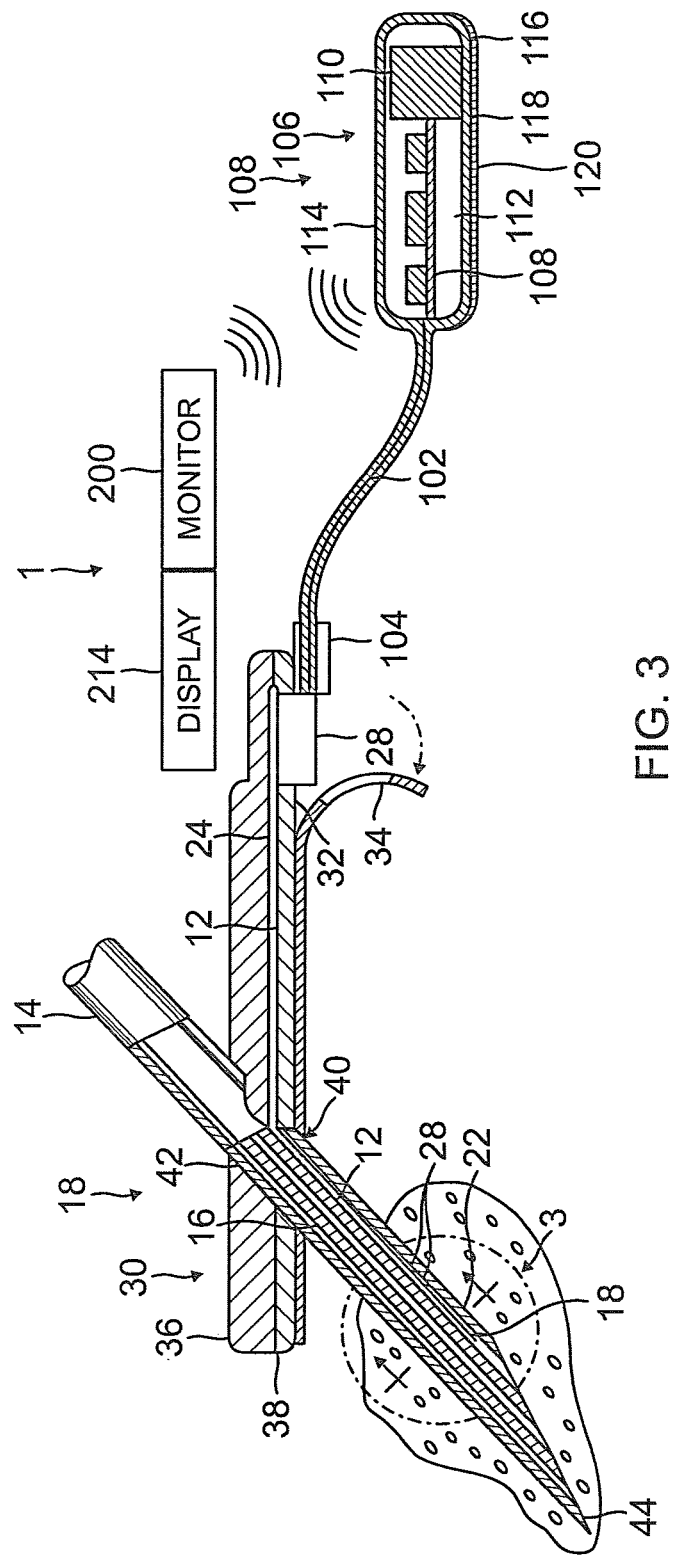
FIG. 3 provides a perspective view illustrating a subcutaneous sensor insertion set, a telemetered characteristic monitor transmitter device, and a data receiving device embodying features of the invention.

As shown in FIG. 3, the electrochemical sensors of the invention include one or more cover constituents which are typically electrically insulating protective constituents (see, e.g. element 406 in FIG. 2A). Typically, such cover constituents can be in the form of a coating, sheath or tube and are disposed on at least a portion of the analyte modulating constituent. Acceptable polymer coatings for use as the insulating protective cover constituent can include, but are not limited to, non-toxic biocompatible polymers such as silicone compounds, polyimides, biocompatible solder masks, epoxy acrylate copolymers, or the like. Further, these coatings can be photo-imageable to facilitate photolithographic forming of apertures through to the conductive constituent. A typical cover constituent comprises spun on silicone. As is known in the art, this constituent can be a commercially available RTV (room temperature vulcanized) silicone composition. A typical chemistry in this context is polydimethyl siloxane (acetoxy based).

C. Typical Analyte Sensor System Embodiments of the Invention

Embodiments of the sensor elements and sensors disclosed herein can be operatively coupled to a variety of other systems elements typically used with analyte sensors (e.g. structural elements such as piercing members, insertion sets and the like as well as electronic components such as processors, monitors, medication infusion pumps and the like), for example to adapt them for use in various contexts (e.g. implantation within a mammal). One embodiment of the invention includes a method of monitoring a physiological characteristic of a user using an embodiment of the invention that includes an input element capable of receiving a signal from a sensor that is based on a sensed physiological characteristic value of the user, and a processor for analyzing the received signal. In typical embodiments of the invention, the processor determines a dynamic behavior of the physiological characteristic value and provides an observable indicator based upon the dynamic behavior of the physiological characteristic value so determined. In some embodiments, the physiological characteristic value is a measure of the concentration of blood glucose in the user. In other embodiments, the process of analyzing the received signal and determining a dynamic behavior includes repeatedly measuring the physiological characteristic value to obtain a series of physiological characteristic values in order to, for example, incorporate comparative redundancies into a sensor apparatus in a manner designed to provide confirmatory information on sensor function, analyte concentration measurements, the presence of interferences and the like.

Embodiments of the invention include devices which display data from measurements of a sensed physiological characteristic (e.g. blood glucose concentrations) in a manner and format tailored to allow a user of the device to easily monitor and, if necessary, modulate the physiological status of that characteristic (e.g. modulation of blood glucose concentrations via insulin administration). An illustrative embodiment of the invention is a device comprising a sensor input capable of receiving a signal from a sensor, the signal being based on a sensed physiological characteristic value of a user; a memory for storing a plurality of measurements of the sensed physiological characteristic value of the user from the received signal from the sensor; and a display for presenting a text and/or graphical representation of the plurality of measurements of the sensed physiological characteristic value (e.g. text, a line graph or the like, a bar graph or the like, a grid pattern or the like or a combination thereof). Typically, the graphical representation displays real time measurements of the sensed physiological characteristic value. Such devices can be used in a variety of contexts, for example in combination with other medical apparatuses. In some embodiments of the invention, the device is used in combination with at least one other medical device (e.g. a glucose sensor).

II. Illustrative Analyte Sensor Systems of the Invention

A number of articles, U.S. patents and patent application describe the state of the art with the common methods and materials disclosed herein and further describe various elements (and methods for their manufacture) that can be used in the sensor designs disclosed herein. These include for example, U.S. Pat. Nos. 6,413,393; 6,368,274; 5,786,439; 5,777,060; 5,391,250; 5,390,671; 5,165,407, 4,890,620, 5,390,671, 5,390,691, 5,391,250, 5,482,473, 5,299,571, 5,568,806; United States Patent Application 20020090738; as well as PCT International Publication Numbers WO 01/58348, WO 03/034902, WO 03/035117, WO 03/035891, WO 03/023388, WO 03/022128, WO 03/022352, WO 03/023708, WO 03/036255, W003/036310 and WO 03/074107, the contents of each of which are incorporated herein by reference.

Typical sensors for monitoring glucose concentration of diabetics are further described in Shichiri, et al.: "In Vivo Characteristics of Needle-Type Glucose Sensor-Measurements of Subcutaneous Glucose Concentrations in Human Volunteers," Horm. Metab. Res., Suppl. Ser. 20:17-20 (1988); Bruckel, et al.: "In Vivo Measurement of Subcutaneous Glucose Concentrations with an Enzymatic Glucose Sensor and a Wick Method," Klin. Wochenschr. 67:491-495 (1989); and Pickup, et al.: "In Vivo Molecular Sensing in Diabetes Mellitus: An Implantable Glucose Sensor with Direct Electron Transfer," Diabetologia 32:213-217 (1989). Other sensors are described in, for example Reach, et al., in ADVANCES IN IMPLANTABLE DEVICES, A. Turner (ed.), JAI Press, London, Chap. 1, (1993), incorporated herein by reference.

FIG. 3 provides a perspective view of one generalized embodiment of subcutaneous sensor insertion system and a block diagram of a sensor electronics device according to one illustrative embodiment of the invention. Additional elements typically used with such sensor system embodiments are disclosed for example in U.S. Patent Application No. 20070163894, the contents of which are incorporated by reference. FIG. 3 provides a perspective view of a telemetered characteristic monitor system 1, including a subcutaneous sensor set 10 provided for subcutaneous placement of an active portion of a flexible sensor 12, or the like, at a selected site in the body of a user. The subcutaneous or percutaneous portion of the sensor set 10 includes a hollow, slotted insertion needle 14 having a sharpened tip 44, and a cannula 16. Inside the cannula 16 is a sensing portion 18 of the sensor 12 to expose one or more sensor electrodes 20 to the user's bodily fluids through a window 22 formed in the cannula 16. The sensing portion 18 is joined to a connection portion 24 that terminates in conductive contact pads, or the like, which are also exposed through one of the insulative layers. The connection portion 24 and the contact pads are generally adapted for a direct wired electrical connection to a suitable monitor 200 coupled to a display 214 for monitoring a user's condition in response to signals derived from the sensor electrodes 20. The connection portion 24 may be conveniently connected electrically to the monitor 200 or a characteristic monitor transmitter 100 by a connector block 28 (or the like).

As shown in FIG. 3, in accordance with embodiments of the present invention, subcutaneous sensor set 10 may be configured or formed to work with either a wired or a wireless characteristic monitor system. The proximal part of the sensor 12 is mounted in a mounting base 30 adapted for placement onto the skin of a user. The mounting base 30 can be a pad having an underside surface coated with a suitable pressure sensitive adhesive layer 32, with a peel-off paper strip 34 normally provided to cover and protect the adhesive layer 32, until the sensor set 10 is ready for use. The mounting base 30 includes upper and lower layers 36 and 38, with the connection portion 24 of the flexible sensor 12 being sandwiched between the layers 36 and 38. The connection portion 24 has a forward section joined to the active sensing portion 18 of the sensor 12, which is folded angularly to extend downwardly through a bore 40 formed in the lower base layer 38. Optionally, the adhesive layer 32 (or another portion of the apparatus in contact with in vivo tissue) includes an anti-inflammatory agent to reduce an inflammatory response and/or anti-bacterial agent to reduce the chance of infection. The insertion needle 14 is adapted for slide-fit reception through a needle port 42 formed in the upper base layer 36 and through the lower bore 40 in the lower base layer 38. After insertion, the insertion needle 14 is withdrawn to leave the cannula 16 with the sensing portion 18 and the sensor electrodes 20 in place at the selected insertion site. In this embodiment, the telemetered characteristic monitor transmitter 100 is coupled to a sensor set 10 by a cable 102 through a connector 104 that is electrically coupled to the connector block 28 of the connector portion 24 of the sensor set 10.

In the embodiment shown in FIG. 3, the telemetered characteristic monitor 100 includes a housing 106 that supports a printed circuit board 108, batteries 110, antenna 112, and the cable 102 with the connector 104. In some embodiments, the housing 106 is formed from an upper case 114 and a lower case 116 that are sealed with an ultrasonic weld to form a waterproof (or resistant) seal to permit cleaning by immersion (or swabbing) with water, cleaners, alcohol or the like. In some embodiments, the upper and lower case 114 and 116 are formed from a medical grade plastic. However, in alternative embodiments, the upper case 114 and lower case 116 may be connected together by other methods, such as snap fits, sealing rings, RTV (silicone sealant) and bonded together, or the like, or formed from other materials, such as metal, composites, ceramics, or the like. In other embodiments, the separate case can be eliminated, and the assembly is simply potted in epoxy or other moldable materials that is compatible with the electronics and reasonably moisture resistant. As shown, the lower case 116 may have an underside surface coated with a suitable pressure sensitive adhesive layer 118, with a peel-off paper strip 120 normally provided to cover and protect the adhesive layer 118, until the sensor set telemetered characteristic monitor transmitter 100 is ready for use.

In the illustrative embodiment shown in FIG. 3, the subcutaneous sensor set 10 facilitates accurate placement of a flexible thin film electrochemical sensor 12 of the type used for monitoring specific blood parameters representative of a user's condition. The sensor 12 monitors glucose levels in the body and may be used in conjunction with automated or semi-automated medication infusion pumps of the external or implantable type as described in U.S. Pat. Nos. 4,562,751; 4,678,408; 4,685,903 or 4,573,994, to control delivery of insulin to a diabetic patient.

In the illustrative embodiment shown in FIG. 3, the sensor electrodes 10 may be used in a variety of sensing applications and may be configured in a variety of ways. For example, the sensor electrodes 10 may be used in physiological parameter sensing applications in which some type of biomolecule is used as a catalytic agent. For example, the sensor electrodes 10 may be used in a glucose and oxygen sensor having a glucose oxidase enzyme catalyzing a reaction with the sensor electrodes 20. The sensor electrodes 10, along with a biomolecule or some other catalytic agent, may be placed in a human body in a vascular or non-vascular environment. For example, the sensor electrodes 20 and biomolecule may be placed in a vein and be subjected to a blood stream or may be placed in a subcutaneous or peritoneal region of the human body.

In the embodiment of the invention shown in FIG. 3, the monitor of sensor signals 200 may also be referred to as a sensor electronics device 200. The monitor 200 may include a power source, a sensor interface, processing electronics (i.e., a processor), and data formatting electronics. The monitor 200 may be coupled to the sensor set 10 by a cable 102 through a connector that is electrically coupled to the connector block 28 of the connection portion 24. In an alternative embodiment, the cable may be omitted. In this embodiment of the invention, the monitor 200 may include an appropriate connector for direct connection to the connection portion 104 of the sensor set 10. The sensor set 10 may be modified to have the connector portion 104 positioned at a different location, e.g., on top of the sensor set to facilitate placement of the monitor 200 over the sensor set.

A. General Methods for Making Analyte Sensors

A typical embodiment of the invention disclosed herein is a method of making a sensor apparatus for implantation within a mammal comprising the steps of: providing a base layer; forming a conductive layer on the base layer, wherein the conductive layer includes an electrode (and typically a working electrode, a reference electrode and a counter electrode); forming a forming an analyte sensing layer over the conductive layer, wherein the analyte sensing layer includes a mediator or the like that can alter the electrical current at the electrode in the conductive layer in the presence of an analyte; forming an analyte modulating layer, wherein the analyte modulating layer includes a composition that modulates the diffusion of the analyte therethrough. In certain embodiments of the invention, the analyte modulating layer comprises a hydrophilic comb-copolymer having a central chain and a plurality of side chains coupled to the central chain, wherein at least one side chain comprises a silicone moiety. In some embodiments of these methods, the analyte sensor apparatus is formed in a planar geometric configuration As disclosed herein, the various layers of the sensor can be manufactured to exhibit a variety of different characteristics which can be manipulated according to the specific design of the sensor. For example, the adhesion promoting layer includes a compound selected for its ability to stabilize the overall sensor structure, typically a silane composition. In some embodiments of the invention, the analyte sensing layer is formed by a spin coating process and is of a thickness selected from the group consisting of less than 1, 0.5, 0.25 and 0.1 microns in height.

Typically, a method of making the sensor includes the step of forming a protein layer on the analyte sensing layer, wherein a protein within the protein layer is an albumin selected from the group consisting of bovine serum albumin and human serum albumin. Typically, a method of making the sensor includes the step of forming an analyte sensing layer that comprises an enzyme composition selected from the group consisting of glucose dehydrogenase, 3-hydroxybutyrate dehydrogenase, lactate oxidase, glucose oxidase, hexokinase and lactate dehydrogenase. In such methods, the analyte sensing layer typically comprises a carrier protein composition in a substantially fixed ratio with the enzyme, and the enzyme and the carrier protein are distributed in a substantially uniform manner throughout the analyte sensing layer.

The disclosure provided herein includes sensors and sensor designs that can be generated using combinations of various well known techniques. The disclosure further provides methods for applying very thin enzyme coatings to these types of sensors as well as sensors produced by such processes. In this context, some embodiments of the invention include methods for making such sensors on a substrate according to art accepted processes. In certain embodiments, the substrate comprises a rigid and flat structure suitable for use in photolithographic mask and etch processes. In this regard, the substrate typically defines an upper surface having a high degree of uniform flatness. A polished glass plate may be used to define the smooth upper surface. Alternative substrate materials include, for example, stainless steel, aluminum, and plastic materials such as delrin, etc. In other embodiments, the substrate is non-rigid and can be another layer of film or insulation that is used as a substrate, for example plastics such as polyimides and the like.

An initial step in the methods of the invention typically includes the formation of a base layer of the sensor. The base layer can be disposed on the substrate by any desired means, for example by controlled spin coating. In addition, an adhesive may be used if there is not sufficient adhesion between the substrate layer and the base layer. A base layer of insulative material is formed on the substrate, typically by applying the base layer material onto the substrate in liquid form and thereafter spinning the substrate to yield the base layer of thin, substantially uniform thickness. These steps are repeated to build up the base layer of sufficient thickness, followed by a sequence of photolithographic and/or chemical mask and etch steps to form the conductors discussed below. In an illustrative form, the base layer comprises a thin film sheet of insulative material, such as ceramic or polyimide substrate. The base layer can comprise an alumina substrate, a polyimide substrate, a glass sheet, controlled pore glass, or a planarized plastic liquid crystal polymer. The base layer may be derived from any material containing one or more of a variety of elements including, but not limited to, carbon, nitrogen, oxygen, silicon, sapphire, diamond, aluminum, copper, gallium, arsenic, lanthanum, neodymium, strontium, titanium, yttrium, or combinations thereof. Additionally, the substrate may be coated onto a solid support by a variety of methods well-known in the art including physical vapor deposition, or spin-coating with materials such as spin glasses, chalcogenides, graphite, silicon dioxide, organic synthetic polymers, and the like.

The methods of the invention further include the generation of a conductive layer having one or more sensing elements. Typically these sensing elements are electrodes that are formed by one of the variety of methods known in the art such as photoresist, etching and rinsing to define the geometry of the active electrodes. The electrodes can then be made electrochemically active, for example by electrodeposition of Pt black for the working and counter electrode, and silver followed by silver chloride on the reference electrode. A sensor layer such as a analyte sensing enzyme layer can then be disposed on the sensing layer by electrochemical deposition or a method other than electrochemical deposition such a spin coating, followed by vapor crosslinking, for example with a dialdehyde (glutaraldehyde) or a carbodiimide.

Electrodes of the invention can be formed from a wide variety of materials known in the art. For example, the electrode may be made of a noble late transition metals. Metals such as gold, platinum, silver, rhodium, iridium, ruthenium, palladium, or osmium can be suitable in various embodiments of the invention. Other compositions such as carbon or mercury can also be useful in certain sensor embodiments. Of these metals, silver, gold, or platinum is typically used as a reference electrode metal. A silver electrode which is subsequently chloridized is typically used as the reference electrode. These metals can be deposited by any means known in the art, including the plasma deposition method cited, supra, or by an electroless method which may involve the deposition of a metal onto a previously metallized region when the substrate is dipped into a solution containing a metal salt and a reducing agent. The electroless method proceeds as the reducing agent donates electrons to the conductive (metallized) surface with the concomitant reduction of the metal salt at the conductive surface. The result is a layer of adsorbed metal. (For additional discussions on electroless methods, see: Wise, E. M. Palladium: Recovery, Properties, and Uses, Academic Press, New York, New York (1988); Wong, K. et al. Plating and Surface Finishing 1988, 75, 70-76; Matsuoka, M. et al. Ibid. 1988, 75, 102-106; and Pearlstein, F. "Electroless Plating," Modern Electroplating, Lowenheim, F. A., Ed., Wiley, New York, N.Y. (1974), Chapter 31.). Such a metal deposition process must yield a structure with good metal to metal adhesion and minimal surface contamination, however, to provide a catalytic metal electrode surface with a high density of active sites. Such a high density of active sites is a property necessary for the efficient redox conversion of an electroactive species such as hydrogen peroxide.

In an exemplary embodiment of the invention, the base layer is initially coated with a thin film conductive layer by electrode deposition, surface sputtering, or other suitable process step. In one embodiment this conductive layer may be provided as a plurality of thin film conductive layers, such as an initial chrome-based layer suitable for chemical adhesion to a polyimide base layer followed by subsequent formation of thin film gold-based and chrome-based layers in sequence. In alternative embodiments, other electrode layer conformations or materials can be used. The conductive layer is then covered, in accordance with conventional photolithographic techniques, with a selected photoresist coating, and a contact mask can be applied over the photoresist coating for suitable photoimaging. The contact mask typically includes one or more conductor trace patterns for appropriate exposure of the photoresist coating, followed by an etch step resulting in a plurality of conductive sensor traces remaining on the base layer. In an illustrative sensor construction designed for use as a subcutaneous glucose sensor, each sensor trace can include three parallel sensor elements corresponding with three separate electrodes such as a working electrode, a counter electrode and a reference electrode.

Portions of the conductive sensor layers are typically covered by an insulative cover layer, typically of a material such as a silicon polymer and/or a polyimide. The insulative cover layer can be applied in any desired manner. In an exemplary procedure, the insulative cover layer is applied in a liquid layer over the sensor traces, after which the substrate is spun to distribute the liquid material as a thin film overlying the sensor traces and extending beyond the marginal edges of the sensor traces in sealed contact with the base layer. This liquid material can then be subjected to one or more suitable radiation and/or chemical and/or heat curing steps as are known in the art. In alternative embodiments, the liquid material can be applied using spray techniques or any other desired means of application. Various insulative layer materials may be used such as photoimagable epoxyacrylate, with an illustrative material comprising a photoimagable polyimide available from OCG, Inc. of West Paterson, N.J., under the product number 7020.

In certain embodiments of the invention materials used to form one or more layers of a sensor stack are selected to control their diffusion coefficients for one or more compounds such as $O_2$ or glucose. Typically, for example, materials forming the interference rejection membrane and/or materials forming the analyte modulating layer are selected so that the diffusivity of $O_2$ diffusion coefficient through said layers is at least $1.0 \times 10^{-5}$ cm$^2$/s 37° C. in phosphate buffered saline (e.g. is between 1.0 and $3.0 \times 10^{-5}$ cm$^2$/s 37° C.). Similarly, in illustrative embodiments of the invention, the materials forming the interference rejection membrane and/or materials forming the analyte modulating layer are selected so as to exhibit a glucose permeability of at least $1 \times 10^{-8}$ cm$^2$/s at 37° C. in phosphate buffered saline.

In an illustrative sensor embodiment for use as a glucose sensor, an enzyme (typically glucose oxidase) is coated with the enzyme so as to define a working electrode. One or both of the other electrodes can be provided with the same coating as the working electrode. Alternatively, the other two electrodes can be provided with other suitable chemistries, such as other enzymes, left uncoated, or provided with chemistries to define a reference electrode and a counter electrode for the electrochemical sensor. Methods for producing the enzyme coatings include spin coating processes, dip and dry processes, low shear spraying processes, ink-jet printing processes, silk screen processes and the like. Typically, such coatings are vapor crosslinked subsequent to their application. Surprisingly, sensors produced by these processes have material properties that exceed those of sensors having coatings produced by electrodeposition including enhanced longevity, linearity, regularity as well as improved signal to noise ratios. In addition, embodiments of the invention that utilize glucose oxidase coatings formed by such processes are designed to recycle hydrogen peroxide and improve the biocompatibility profiles of such sensors.

Sensors generated by processes such as spin coating processes also avoid other problems associated with electrodeposition, such as those pertaining to the material stresses placed on the sensor during the electrodeposition process. In particular, the process of electrodeposition is observed to produce mechanical stresses on the sensor, for example mechanical stresses that result from tensile and/or compression forces. In certain contexts, such mechanical stresses may result in sensors having coatings with some tendency to crack or delaminate. This is not observed in coatings disposed on sensor via spin coating or other low-stress processes.

In some embodiments of the invention, the sensor is made by methods which apply an analyte modulating layer that comprises a hydrophilic membrane coating which can regulate the amount of analyte that can access the enzyme of the sensor layer. For example, the cover layer that is added to the glucose sensors of the invention can comprise a glucose limiting membrane, which regulates the amount of glucose that access glucose oxidase enzyme layer on an electrode. Such glucose limiting membranes can be made from a wide variety of materials known to be suitable for such purposes, e.g., silicones such as polydimethyl siloxane and the like, polyurethanes, cellulose acetates, NAFION, polyester sulfonic acids (e.g. Kodak AQ), hydrogels or any other membrane known to those skilled in the art that is suitable for such purposes. In certain embodiments of the invention, the analyte modulating layer comprises a hydrophilic comb-copolymer having a central chain and a plurality of side chains coupled to the central chain, wherein at least one side chain comprises a silicone moiety. In some embodiments of the invention pertaining to sensors having hydrogen peroxide recycling capabilities, the membrane layer that is disposed on the glucose oxidase enzyme layer functions to inhibit the release of hydrogen peroxide into the environment in which the sensor is placed and to facilitate hydrogen peroxide molecules and accessing the electrode sensing elements.

The invention claimed is:

1. An analyte sensor apparatus comprising:
a base layer;
a conductive layer disposed on the base layer, wherein the conductive layer includes a working electrode;
an analyte sensing layer disposed on the working electrode, wherein the analyte sensing layer:
comprises an enzyme selected to react with the analyte;
a polymer;
1-[3-(Succinimidyloxycarbonyl) propoxy]-5-ethylphenazinium triflate (AR-PES) crosslinked to the polymer; and
the enzyme crosslinked to the polymer;
an analyte modulating layer disposed on the analyte sensing layer, wherein the analyte modulating layer includes a composition that modulates the diffusion of the analyte therethrough.

2. The analyte sensor apparatus of claim 1, wherein the enzyme comprises a glucose dehydrogenase, a 3-hydroxybutyrate dehydrogenase, a lactate oxidase or a glucose oxidase.

3. The analyte sensor apparatus of claim 2, wherein the polymer comprises:
a polylysine polymer;
a polyallylamine polymer;
a polyethylene glycol polymer; or
a polyethyleneimine polymer.

4. The analyte sensor apparatus of claim 3, wherein the analyte sensing layer is operably coupled to a flavin adenine dinucleotide or a nicotinamide adenine dinucleotide.

5. The analyte sensor apparatus of claim 4, wherein AR-PES is crosslinked to a polylysine polymer.

6. The analyte sensor apparatus of claim 5, wherein the working electrode is formed from a carbon composition.

7. A method of making an analyte sensor apparatus of claim 1, comprising the steps of:
providing a base layer;
forming a conductive layer on the base layer, wherein the conductive layer includes a working electrode;
forming an analyte sensing layer, wherein the analyte sensing layer:
comprises an enzyme selected to react with an analyte;
a polymer;
1-[3-(Succinimidyloxycarbonyl) propoxy]-5-ethylphenazinium triflate (AR-PES) crosslinked to the polymer; and
the enzyme crosslinked to the polymer; and
forming an analyte modulating layer, wherein the analyte modulating layer includes a composition that modulates the diffusion of the analyte therethrough.

8. The method of claim 7, wherein the enzyme comprises a glucose dehydrogenase, a 3-hydroxybutyrate dehydrogenase, a lactate oxidase or a glucose oxidase.

9. The method of claim 8, wherein the polymer comprises:
a polylysine polymer;
a polyallylamine polymer;
a polyethylene glycol polymer; or
a polyethyleneimine polymer.

10. The method of claim 9, wherein the analyte sensing layer is operably coupled to a flavin adenine dinucleotide cofactor or a nicotinamide adenine dinucleotide cofactor.

11. The method of claim 10, wherein the (AR-PES) is crosslinked to amine functionalized polymers, wherein the amine functionalized polymers are also crosslinked with the enzyme in a manner that facilitates electron transfer from an enzyme-analyte reaction to the working electrode.

12. The method of claim 7, wherein:
the working electrode is formed from a carbon composition; and/or
the (AR-PES), the enzyme and/or a cofactor is crosslinked to the polymer via a poly(ethylene) glycol diglycidyl ether (PEGDGE).

13. The method of claim 7, further comprising sterilizing the analyte sensor apparatus with a process comprising exposing the analyte sensor apparatus to an ethylene oxide gas.

14. A method of estimating the concentrations of an analyte in vivo, the method comprising:
disposing an amperometric analyte sensor of claim 1 into an in vivo environment of a subject, wherein the environment comprises the analyte; and
estimating the concentration of the analyte by measuring the current generated by the analyte sensor;
so that the concentrations of the analyte in vivo are estimated.

15. The method of claim 14, wherein the analyte sensor apparatus senses the analyte using an operating potential that is from −200 millivolts to +100 millivolts.

16. The method of claim 15, wherein the analyte is glucose.

17. The method of claim 15, wherein the analyte is 3-hydroxybutyrate.

18. The method of claim 16, wherein the analyte is lactate.

19. The method of claim 14, wherein the amperometric analyte sensor comprises amine reactive phenazine ethosulphate coupled to a polylysine polymer.

* * * * *